(12) United States Patent  
Hasegawa et al.

(10) Patent No.: US 9,696,613 B2  
(45) Date of Patent: Jul. 4, 2017

(54) IMAGE PROCESSING APPARATUS, PROJECTOR AND IMAGE PROCESSING METHOD

(75) Inventors: Fumihiro Hasegawa, Tokyo (JP); Shinichi Sumiyoshi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 263 days.

(21) Appl. No.: 14/235,281

(22) PCT Filed: Aug. 3, 2012

(86) PCT No.: PCT/JP2012/070412  
§ 371 (c)(1),  
(2), (4) Date: Jan. 27, 2014

(87) PCT Pub. No.: WO2013/024794  
PCT Pub. Date: Feb. 21, 2013

(65) Prior Publication Data  
US 2014/0168376 A1    Jun. 19, 2014

(30) Foreign Application Priority Data  
Aug. 18, 2011 (JP) ................................ 2011-178810

(51) Int. Cl.  
*G03B 21/14* (2006.01)  
*H04N 9/31* (2006.01)  
(Continued)

(52) U.S. Cl.  
CPC ............ *G03B 21/142* (2013.01); *G01C 11/04* (2013.01); *H04N 5/74* (2013.01); *H04N 9/3185* (2013.01); *H04N 9/3194* (2013.01); *G03B 21/53* (2013.01)

(58) Field of Classification Search  
CPC ..................................................... G03B 21/14  
See application file for complete search history.

(56) References Cited

U.S. PATENT DOCUMENTS 7,125,122 B2   10/2006   Li et al.  
7,167,645 B2 *  1/2007   Matsuda ............. H04N 9/3194  
                                             348/362  
(Continued)

FOREIGN PATENT DOCUMENTS

JP       6-027431       2/1994  
JP       2002-062842    2/2002  
(Continued)

OTHER PUBLICATIONS

Office Action issued May 12, 2015 in Japanese Patent Application No. 2011-178810.

(Continued)

*Primary Examiner* — Christopher Findley  
(74) *Attorney, Agent, or Firm* — Oblon, McClelland, Maier & Neustadt, L.L.P.

(57) ABSTRACT

An image processing apparatus includes an imaging unit configured to image a region including a target on which an image is projected to acquire imaged data, a distance measuring unit configured to compute distance data associated with a distance between the target and the imaging unit based on the imaged data acquired from the imaging unit, a plane estimating unit configured to estimate a plane corresponding to the target based on the distance data, and a range specifying unit configured to generate image data associated with the region based on the imaged data and specify a projectable range to the target based on the image data and information associated with the plane.

11 Claims, 18 Drawing Sheets

(51) Int. Cl.
*G01C 11/04* (2006.01)
*H04N 5/74* (2006.01)
*G03B 21/53* (2006.01)

(56) References Cited

U.S. PATENT DOCUMENTS

| | | | |
|---|---|---|---|
| 7,226,173 | B2 | 6/2007 | Aoyanagi |
| 2005/0036117 | A1* | 2/2005 | Kobayashi ............... H04N 5/74 353/70 |
| 2005/0041216 | A1 | 2/2005 | Kobayashi |
| 2005/0046803 | A1* | 3/2005 | Akutsu ............... H04N 9/3194 353/69 |
| 2005/0190343 | A1* | 9/2005 | Kuwabara ............. G03B 21/53 353/70 |
| 2006/0158623 | A1 | 7/2006 | Kobayashi et al. |
| 2007/0002287 | A1 | 1/2007 | Matsumoto et al. |
| 2010/0045942 | A1 | 2/2010 | Furui |
| 2011/0110590 | A1 | 5/2011 | Suzuki |

FOREIGN PATENT DOCUMENTS

| | | |
|---|---|---|
| JP | 2002-247614 | 8/2002 |
| JP | 2005-038388 | 2/2005 |
| JP | 2005-181726 | 7/2005 |
| JP | 2006-010945 | 1/2006 |
| JP | 2006-129511 | 5/2006 |
| JP | 3880582 | 2/2007 |
| JP | 2007-142495 | 6/2007 |
| JP | 2009-276073 A | 11/2009 |

OTHER PUBLICATIONS

International Search Report and Written Opinion of the International Searching Authority issued Nov. 13, 2012, in PCT/JP2012/070412, filed Aug. 3, 2012.

Extended European Search Report issued Aug. 8, 2014 in Patent Application No. 12824662.6.

* cited by examiner

IMAGE PROCESSING APPARATUS, PROJECTOR AND IMAGE PROCESSING METHOD

TECHNICAL FIELD

The disclosures herein relate to an image processing apparatus, a projector, and an image processing method.

BACKGROUND ART

The projector is configured to project an image onto a target such as a screen. There is a kind of a projector that measures a distance from the projector to the target and adjusts a focus on the image subject to being projected based on the measured distance. Further, there is another kind of a projector that takes a picture of the projected image to adjust a focus on the projected image based on the imaged picture.

Japanese Laid-Open Patent Application Publication No. 6-27431 (hereinafter referred to as "Patent Document 1"), for example, discloses a technology of adjusting a focus on a target that includes causing an active sensor to radiate the target with infrared rays and measuring a distance between the active sensor and the target based on the intensity of the received light reflected from the target.

Japanese Laid-open Patent Publication No. 2006-10945 (hereinafter referred to as "Patent Document 2"), for example, discloses a technology of adjusting autofocus that includes imaging a projected focus-specific pattern, detecting brightness differences between adjacent pixels of all the pixels of the imaged data, computing an absolute value corresponding to a sum of the brightness differences, and moving a focus lens to a position at which the sum corresponds to a maximum absolute value.

Japanese Laid-open Patent Publication No. 2005-181726 (hereinafter referred to as "Patent Document 3"), for example, discloses a technology (i.e., hill-climbing autofocus technology) of adjusting a focused focal point that includes allowing a photosensor to receive light reflected off a projected image, acquiring a high-frequency component from electric signals output from the phototectector, computing a contrast of the image signal (image data) obtained by integrating the acquired high-frequency component, and determining a position at which the computed contrast corresponds to a maximum value as the focused focal point.

In projecting an image by a projector, it may be necessary to project the image within a projectable range of a target such as a screen. Some kinds of the projectors are configured to specify a projectable range of the target and perform image processing (e.g., enlargement, reduction, and keystone correction) on an image to be projected so as to project the image within the specified projectable range.

The technology disclosed in Patent Document 1 may be capable of specifying the projectable range in the target (e.g., screen) by moving an optical axis of the infrared ray emitted from the active sensor utilizing a prism and measuring a distance from the active sensor to the target to specify an outer shape of the target.

The technologies disclosed in Patent Document 2 and Patent Document 3 may be capable of specifying the projectable range in the target by taking an image including a target (e.g., screen) and specifying an outer shape of the target based on brightness and contrast of the taken image.

However, when an obstacle such as a presenter or a desk is present between the projector and the target (e.g., screen), or when a wall is adjacent to a backside surface of the target, the technology disclosed in Patent Document 1 may be unable to specify the projectable range on the target due to errors occurred based on a signal input level of the photodetector element in the measured distance from the sensor to the target. Further, the technologies disclosed in Patent Document 2 and Patent Document 3 may be unable to specify the outer shape of the target based on the brightness and contrast, which may result in failing to specify the projectable range in the target.

RELATED ART DOCUMENT

Patent Documents

Patent Document 1: Japanese Laid-Open Patent Application Publication No. 6-27431
Patent Document 2: Japanese Laid-open Patent Publication No. 2006-10945
Patent Document 3: Japanese Laid-open Patent Publication No. 2005-181726

SUMMARY OF THE INVENTION

It is a general object of at least one embodiment of the present invention to provide an information processing apparatus, a projector having the information processing apparatus and an information processing method capable of specifying a position of a target and a projectable range on the target adjacent to a wall situated at a backside of the target, which substantially eliminate one or more problems caused by the limitations and disadvantages of the related art.

According to an embodiment, there is provided an image processing apparatus that includes an imaging unit configured to image a region including a target on which an image is projected to acquire imaged data; a distance measuring unit configured to compute distance data associated with a distance between the target and the imaging unit based on the imaged data acquired from the imaging unit; a plane estimating unit configured to estimate a plane corresponding to the target based on the distance data; and a range specifying unit configured to generate image data associated with the region based on the imaged data and specify a projectable range on the target based on the image data and information associated with the plane.

BEST MODE OF CARRYING OUT THE INVENTION

Preferred embodiments are described below with reference to the accompanying drawings.

An image processing apparatus according to an embodiment is capable of specifying a projectable range on a target by carrying out image processing on an imaged target.

Configuration of Image Processing Apparatus

Figure 1:
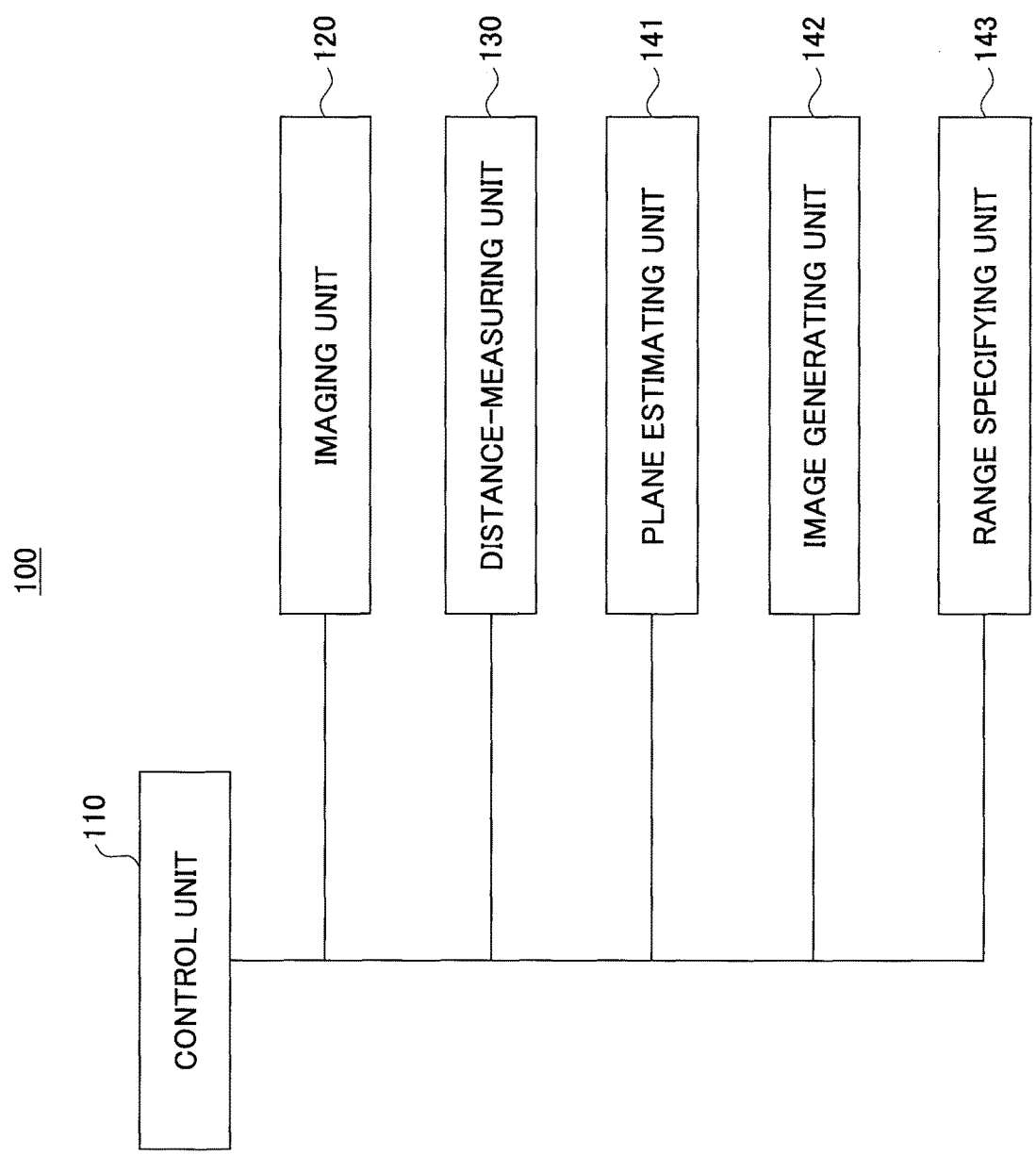
FIG. 1 is a schematic configuration diagram illustrating an example of an image processing apparatus according to an embodiment.

FIG. 1 is a schematic configuration diagram illustrating an example of an image processing apparatus according to an embodiment.

In FIG. 1, the image processing apparatus 100 includes a control unit 110, an imaging unit 120, a distance measuring unit 130, a plane estimating unit 141, an image generating unit 142, and a range specifying unit 143.

The image processing apparatus 100 is configured to cause the distance measuring unit 130 to compute distance data based on an imaged image acquired by imaging a region including a target onto which an image is projected (hereinafter the target is referred to as a "projection target"). Further, the image processing apparatus 100 is configured to cause the plane estimating unit 141 to estimate a plane corresponding to positions of the projection target based on the computed distance data. Moreover, the image processing apparatus 100 is configured to cause the range specifying unit 143 to specify a projectable range on the projection target based on the estimated information associated with the plane and the image data generated by the image generating unit 142.

Note that the projection target is any object to an outer surface of which an image is projectable. Examples of such projection targets include a screen, a wall, and a white board.

The control unit 110 is configured to perform an overall control over the image processing apparatus 100. The control unit 110 is configured to control the imaging unit 120 and the like. Further, the control unit 110 is configured to control processing for outputting an image processing result of the image processing apparatus 100 based on externally supplied information or the like.

The imaging unit 120 is configured to form an image of a region including the projection target on an imaging element (i.e., image sensor) and acquire a pixel output signal of the imaging element as imaging data. The imaging unit 120 in this embodiment includes a stereo camera and a signal processing part. The stereo camera includes two imaging lenses and two imaging elements. The stereo camera images the projection target by the two imaging lenses simultaneously.

The imaging lenses are configured to allow an image of the projection target to be incident on the imaging elements. Each of the imaging elements includes a photodetector surface formed of plural photodetector elements (i.e., pixels) arranged in a lattice. Hence, an image including the projection target incident via the imaging lens is formed on the photodetector surface of each of the imaging elements. The imaging elements may be formed of solid imaging elements, organic imaging elements or the like.

The signal processing part is configured to output the pixel output signal output from each of the imaging elements into the distance measuring unit 130.

The distance measuring unit 130 is configured to measure a distance from the image processing apparatus 100 to the projection target. More specifically, in this embodiment, the distance measuring unit 130 is configured to compute the distance from the image processing apparatus 100 to the projection target based on trigonometric principles. Details of the distance measuring unit 130 will be described in the later-described "DISTANCE DATA COMPUTING OPERATION".

The plane estimating unit 141 is configured to recurrently approximate a plane corresponding to the projection target based on the distance measured by the distance measuring unit 130. Note that "recurrently approximates a plane" indicates approximately estimating a plane based on plural positions and subsequently reestimating the plane by excluding a position located at a predetermined distance from the estimated plane. Note that this method is called a regression analysis method. Details of the plane estimating unit 141 will be described in the later-described "PLANE ESTIMATING OPERATION".

The image generating unit 142 is configured to generate image data of a region including the imaged projection target based on the imaged data taken by the imaging unit 120. Details of the image generating unit 142 will be described in the later-described "PROJECTABLE RANGE SPECIFYING OPERATION".

Moreover, the range specifying unit 143 is configured to specify a projectable range on the projection target based on the information associated with the plane estimated by the plane estimating unit 141 and the imaged data including the region including the projection target taken by the imaging unit 120. Details of the range specifying unit 143 will be described in the later-described "PROJECTABLE RANGE SPECIFYING OPERATION".

Functionality of Image Processing Apparatus

Examples of functions of the image processing apparatus are described with reference to FIG. 2.

Figure 2:
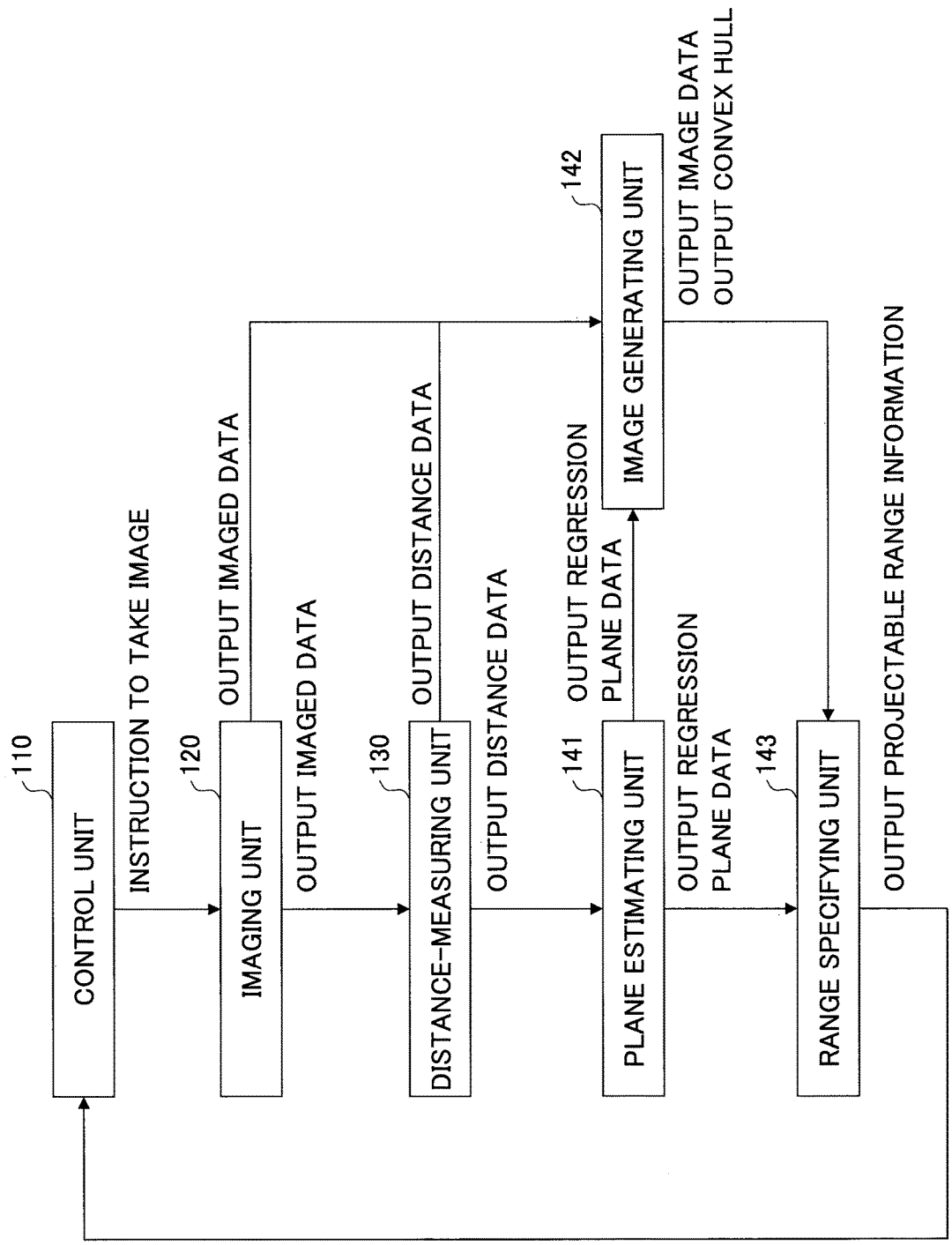
FIG. 2 is a functional block diagram illustrating examples of functions of the image processing apparatus.

FIG. 2 illustrates a functional block diagram of the image forming apparatus according to the embodiment.

In FIG. 2, the control unit 110 is configured to output an imaging instruction signal to the imaging unit 120 so as to initiate an image processing operation.

The imaging unit 120 is configured to cause the stereo camera to take an image of a region including the projection target to acquire two imaged data. The imaging unit 120 is further configured to cause the signal processing part to output the acquired two imaged data to the distance measuring unit 130 and the image generating unit 142. Note that imaged data indicates electrical signal data (pixel output signals) converted from a contrast of light received by the photodetector element.

The distance measuring unit 130 is configured to compute distance data corresponding to plural positions (herein after simply called "corresponding points") on an outer surface of the projection target based on the two data. The distance measuring unit 130 is further configured to output the computed distance data to the plane estimating unit 141 and the image generating unit 142. Note that the distance data indicate data associated with a distance from the image processing apparatus to the projection target (i.e., corresponding points).

The plane estimating unit 141 is configured to compute regression plane data as a plane corresponding to the projection target based on the distance data acquired by the distance measuring unit 130. The plane estimating unit 141 is further configured to output the computed regression plane data to the image generating unit 142 and the range specifying unit 143. Note that the regression plane data indicate data associated with the plane including the plural positions in a three-dimensional space computed by the regression analysis.

The image generating unit 142 generates image data associated with a region including the projection target based on the imaged data taken by the imaging unit 120. The image generating unit 142 is further configured to compute convex hull data based on the regression plane data computed by the plane estimating unit 141 and the distance data computed by the distance measuring unit 130. Note that the image data indicate data associated with the image obtained by performing digital processing on the pixel output signals output from the imaging elements. Further, the convex hull data indicate data associated with a polygon covering the corresponding points that reside in the plane estimated by the plane estimating unit 141 and that are computed by the distance measuring unit 130.

The range specifying unit 143 is configured to specify a projectable range on the projection target based on the regression plane data computed by the plane estimating unit 141, the image data and the convex hull data generated by the image generating unit 142. The range specifying unit 143 is further configured to cause the control unit 110 to output information associated with a result specifying the projectable range to a not-illustrated output unit.

Corresponding Point Extracting Operation

Figure 3:
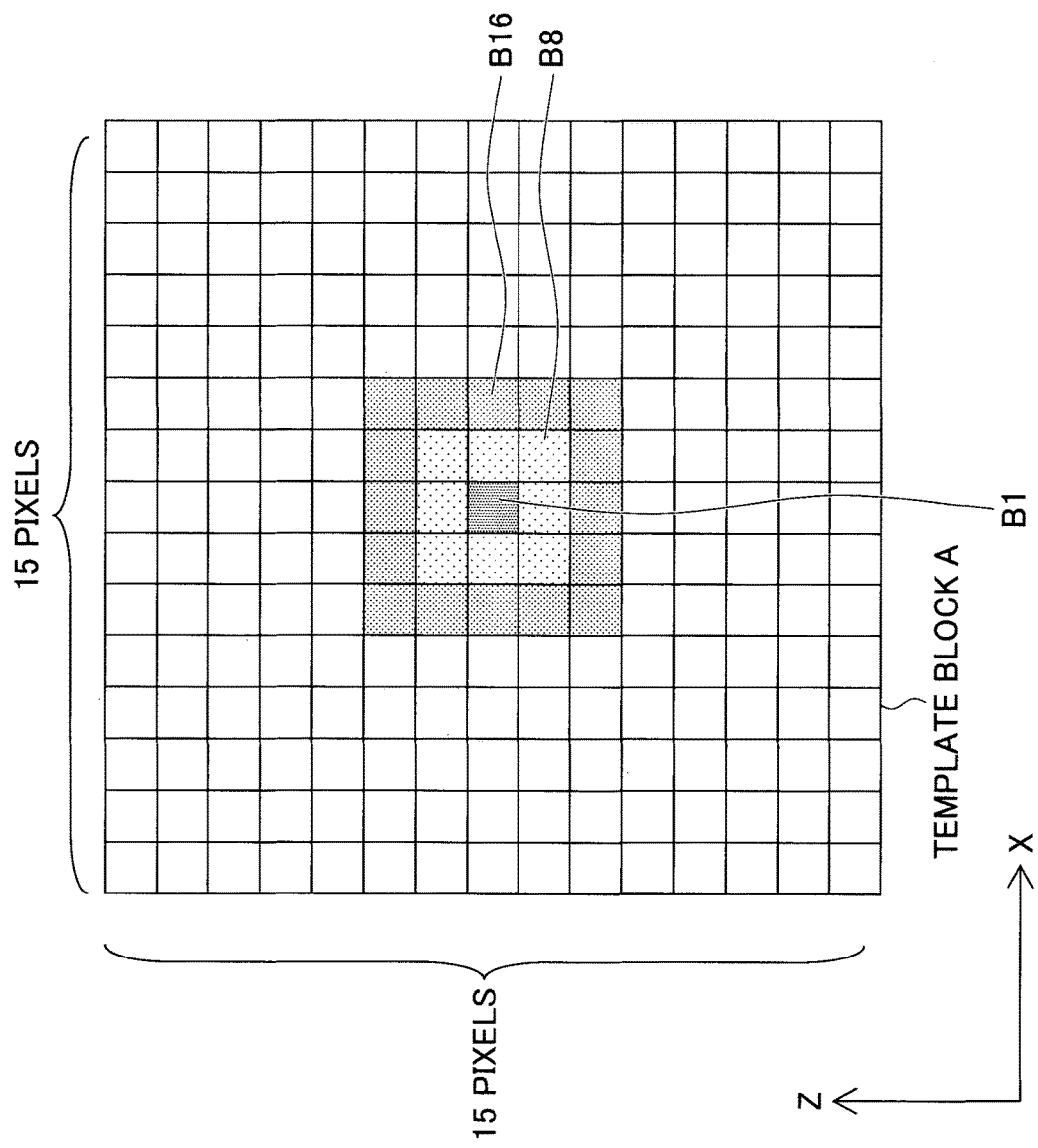
FIG. 3 is a diagram illustrating a luminance component of a pixel output signal output per pixel.

A description is given with reference to FIGS. 3 and 4 of an operation of the distance measuring unit 130 to extract the corresponding points based on the two imaged data acquired by the stereo camera in the imaging unit.

FIG. 3 is a diagram illustrating a luminance component of a pixel output signal output per pixel in association with the imaged data of the projection target taken by the stereo camera of the imaging unit. In FIG. 3, an X direction represents a direction of a row or a column in which pixels (i.e., photodetector elements) are arranged in a lattice. Likewise, a Z direction represents a direction of a row or a column of the lattice that is orthogonal to the X direction.

In FIG. 3, the distance measuring unit 130 (see FIG. 2) initially selects any one (i.e., B1 in FIG. 3) of pixels as a select point from one (hereinafter called "imaged data A") of the two imaged data acquired by the stereo camera.

Subsequently, the distance measuring unit 130 compares a luminance component of the select point with luminance components of eight pixels (B8 in FIG. 3) peripheral to the select point of the imaged data A. In this case, if the luminance components of the eight pixels are all greater than or all smaller than the luminance component of the select point, the distance measuring unit 130 extracts the select point as a feature point $(x_A, z_A)$. Further, the distance measuring unit 130 extracts a square range having the feature point at a center and 15 pixels on a side as a "template block A".

Note that in a case where the imaging unit 120 (see FIG. 2) outputs a pixel output signal with RGB signals (i.e., a signal having red, green and blue components corresponding to three primary colors), only the signal having the green component that approximately represents luminance may be utilized as the luminance components to be compared. Further, the distance measuring unit 130 may alternatively compare a luminance component of a pixel of the select point with luminance components of 16 pixels (B16 in FIG. 3) peripheral to the select point.

Subsequently, the distance measuring unit 130 (see FIG. 2) selects any one of pixels as a select point $(x_B, z_B)$ from the other one (hereinafter called "imaged data B") of the two imaged data acquired by the stereo camera. Further, the distance measuring unit 130 selects a square range having the select point at a center and 15 pixels on a side as a "template block B" (not illustrated).

Subsequently, the distance measuring unit 130 computes a sum of luminance (or brightness) in the template block A and a sum of luminance or brightness in the template block A, and the distance measuring unit 130 compares the two sums. As a method for comparing the above two sums, a later-described sum of absolute distance (SAD) or a later-described sum of squared differences (SSD) may be employed.

Subsequently, the distance measuring unit 130 selects the select point $(x_B, z_B)$ in the template block B, at which the difference between the two sums is a minimum value in the comparison result between the template block A and the template block B. In this case, when the difference between the two sums is a predetermined value or less, the feature point $(x_A, z_A)$ of the imaged data A is associated with the select point $(x_B, z_B)$ of the imaged data B, and the feature point $(x_A, z_A)$ associated with the select point $(x_B, z_B)$ is extracted as a corresponding point $(x_{AB}, z_{AB})$.

Note that the predetermined value may be a distance between the projection target and the image processing apparatus or a value corresponding to depth of field (DOF). Alternatively, the predetermined value may be determined based on numeric computation or an experiment.

The distance measuring unit 130 compares all the feature points extracted from the image data A with the select point of the imaged data B. In this case, the distance measuring unit 130 extracts plural corresponding points (hereinafter called "three-dimensional point group").

Note that SAD is employed as a method for computing a sum of the differences of the absolute values in comparison between the sums. If a pixel is represented by relative coordinates (x, z), a comparison value (e.g., luminance component) of the imaged data A is represented by $I_A(x, z)$ and a comparison value of the imaged data B is represented by $I_B(x, z)$, a sum of differences (AD) may be obtained by the following formula (1).

$$AD = \sum_{i=-7}^{7}\sum_{k=-7}^{7} |I_A(i+x_A, k+z_A) - I_B(i+x_B, k+z_B)| \quad (1)$$

By contrast, SSD is employed as a method for computing a sum of squared differences. A sum of squared differences (SD) may be obtained by the following formula (2).

$$SD = \sum_{i=-7}^{7} \sum_{k=-7}^{7} \{I_A(i+x_A, k+z_A) - I_B(i+x_B, k+z_B)\}^2 \quad (2)$$

Figure 4A:
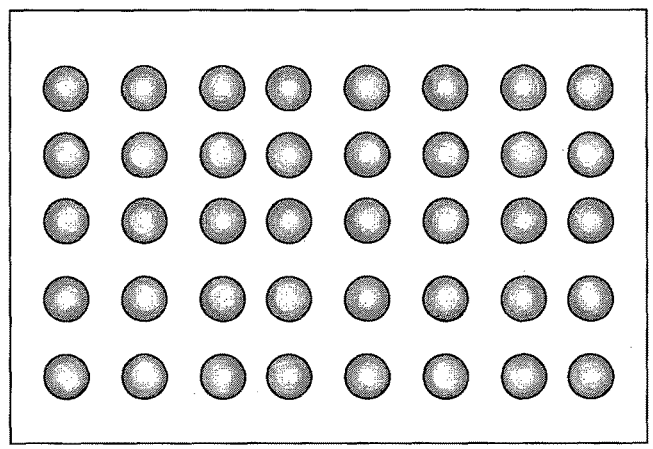
FIGS. 4A through 4C are diagrams illustrating examples of correcting patterns.
Figure 4B:
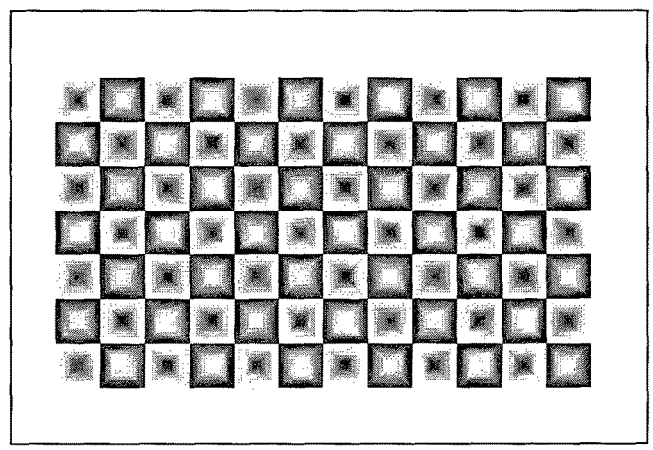
Figure 4C:
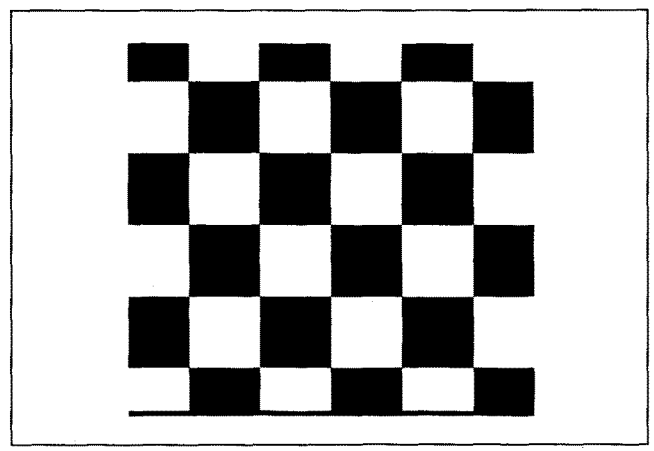

FIGS. 4A through 4C are diagrams illustrating examples of predetermined patterns (correcting patterns) projected onto the projection target.

The distance measuring unit 130 may employ a pattern composed of plural circles as a predetermined pattern projected onto the projection target upon extracting the corresponding points. In this case, the distance measuring unit 130 may extract central points of the plural circles as the corresponding points based on at least one of information including color, brightness and edge strength of the imaged data acquired by the imaged pattern. FIG. 4A illustrates an example of a pattern composed of plural circles. Note that a diameter of the circle to be projected may be determined within a range in which three circles are projected in a projectable range on the projection target, because an image of one circle formed in the imaging element of the imaging unit has a size corresponding to one of the photodetector elements (i.e., one pixel) arranged on the surface of the imaging element.

Moreover, the distance measuring unit 130 may employ a lattice pattern as the predetermined pattern. In this case, the distance measuring unit 30 may extract edge points (corners of each lattice) of the lattice as the corresponding points based on information of at least one of color, brightness and edge strength of the imaged data acquired by the imaged pattern. FIGS. 4B and 4C each illustrate an example of a lattice pattern.

Distance Data Computing Operation

Figure 5:
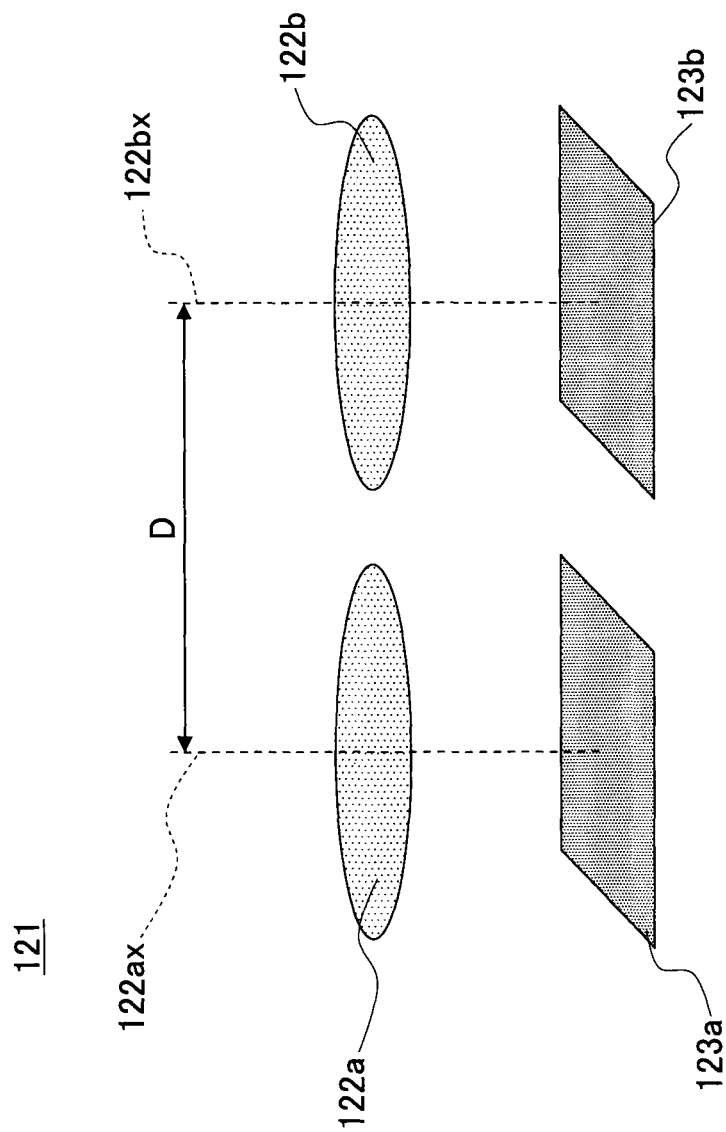
FIG. 5 is an enlarged diagram illustrating an example of a major part of a stereo camera.

A description is given with reference to FIG. 5 of a distance data computing operation performed by the distance measuring unit 130 to cause the stereo camera to compute distance data associated with a distance from the imaging unit (i.e., the image processing apparatus) to the corresponding points (i.e., the projection target).

FIG. 5 is an enlarged diagram illustrating an example of a major part of a stereo camera.

In FIG. 5, a stereo camera 121 includes a first imaging lens 122a and a second imaging lens 122b. The stereo camera 121 further includes a first imaging element 123a and a second imaging element 123b arranged in respective backside directions (directions opposite to directions toward the projection target) of the first imaging lens 122a and the second imaging lens 122b. Note that the first imaging element 123a and the second imaging element 123b may be formed of an area sensor, a surface sensor, a two-dimensional sensor or the like.

The first imaging lens 122a is located at a predetermined distance D (hereinafter called a "base length") from the imaging lens 122b. An optical axis 122ax of the first imaging lens 122a is parallel to an optical axis 122bx of the imaging lens 122b. Each of the first and the second imaging elements 123a and 123b has a photodetector surface on a front surface (opposite to a backside surface) and an image of the target is formed on the photodetector surface. The optical axes 122ax and 122bx of the first and the second imaging lens 122a and 122b are located at positions that match centers of diagonal lines in the respective imaging elements 123a and 123b.

The distance measuring unit 130 extracts plural corresponding points by the aforementioned corresponding point extracting operation based on the two sets of the imaged data taken by the stereo camera. Further, the distance measuring unit 130 computes distance data associated with a distance from the image processing apparatus 100 to the extracted corresponding points (i.e., the projection target) based on trigonometric principles.

Specifically, a first image of the projection target acquired via the first imaging lens 122a is formed on the photodetector surface of the first imaging element 123a. Likewise, a second image of the projection target acquired via the second imaging lens 122b is formed on the photodetector surface of the second imaging element 123b. Note that the first image and the second image of the projection target are displaced by parallax Δ, and are formed on the respective photodetector surfaces. In this case, the imaging elements 123a and 123b photoelectrically convert optical contrast of the respective first image and second image into amounts of electric charges, and the converted amounts of electric charges are then output as pixel output signals to the distance measuring unit 130. The distance measuring unit 130 compares the pixel output signals between the imaging elements 123a and 123b so as to detect the parallax Δ in the respective points. Note that if the parallax is Δ, the base length is D, the distance between the image processing apparatus and the corresponding point is L, and a focal length of the imaging lens 122a and the like is f, the following formula (3) may be established based on a condition represented by L>>f (trigonometric principles).

$$L = D \cdot f / \Delta \quad (3)$$

In this case, D and f are known values in the formula (3). The distance measuring unit 130 computes the distance L based on the parallax Δ utilizing the formula (3). Further, the distance measuring unit 130 acquires distance data associated with a distance of the three-dimensional point group as distance data having the computed distance L for the corresponding points.

Plane Estimating Operation

An operation of the plane estimating unit 141 (see FIG. 2) to estimate a plane corresponding to the projection target is described with reference to FIG. 6.

Figure 6:
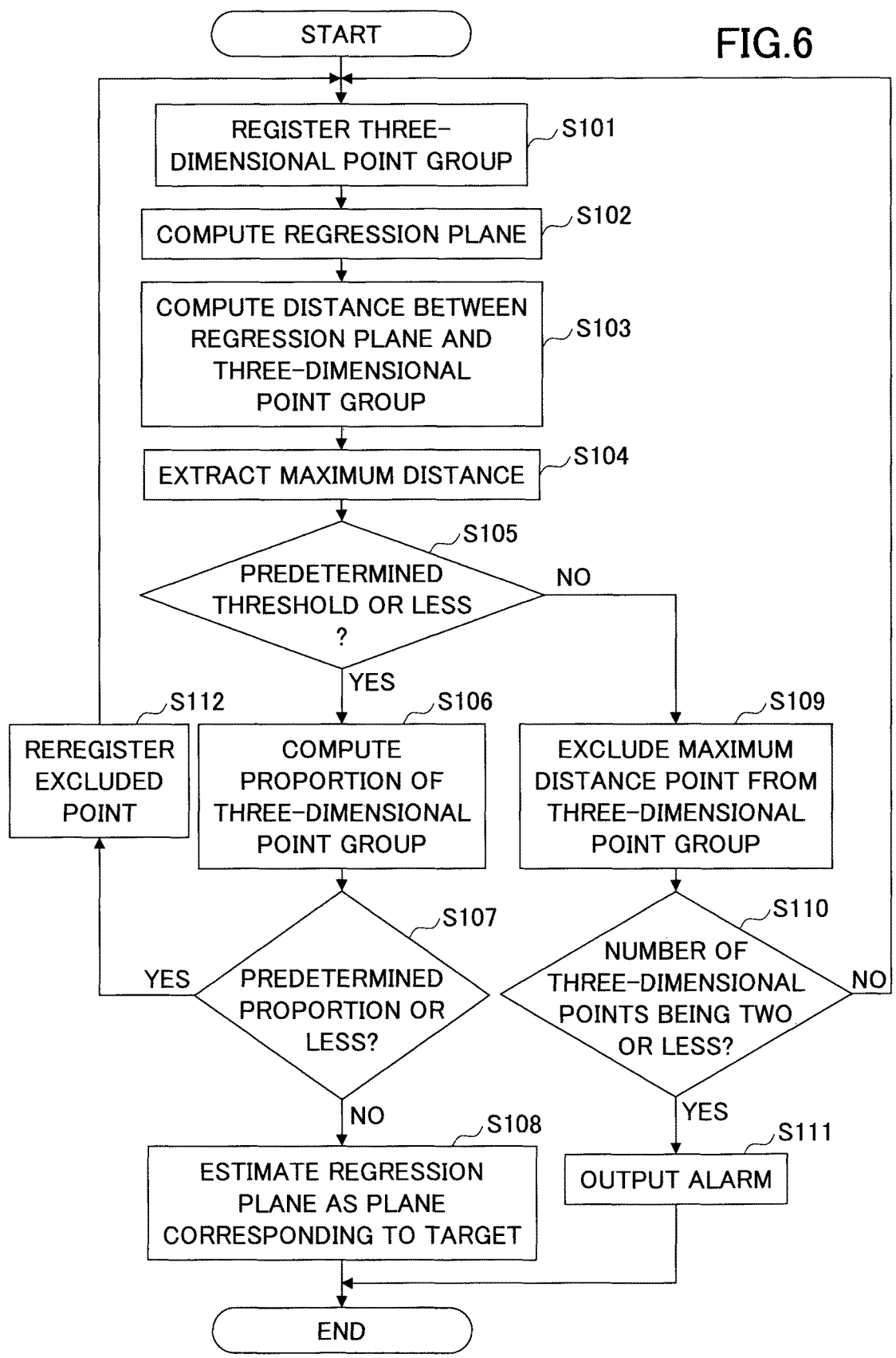
FIG. 6 is a flowchart illustrating an example of an operation of a plane estimating unit.

FIG. 6 is a flowchart illustrating an example of an operation of the plane estimating unit 141.

In FIG. 6, the control unit 110 (see FIG. 2) inputs (registers) distance data of the three-dimensional point group (i.e., the corresponding points) computed by the distance measuring unit 130 into the distance measuring unit 141 (see FIG. 2) (step S101). Subsequently, step S102 is processed.

In step S102, the plane estimating unit 102 computes regression plane data associated with a plane corresponding to the projection target based on the distance data. A specific description is given below of a method for computing the regression plane data in step S102.

In the aforementioned corresponding point extracting operation, n corresponding points ($x_{ABi}$, $y_{ABi}$, $z_{ABi}$) (i=1 to n) are acquired as a three-dimensional point group. Note that a y-axis direction corresponds to an optical axis direction of the stereo camera 121 serving as the imaging unit in FIG. 5. Further, $y_{ABi}$ represents a Y component of the distance L between the projection target (corresponding points ($x_{ABi}$, $z_{ABi}$)) and the image processing apparatus 100.

The plane estimating unit 141 is configured to compute a regression plane from the three-dimensional point group by utilizing the regression analysis. Hence, the equation for regression plane is defined as y=ax+bz+c. Note that the regression plane and the three-dimensional point group are determined based on the following formula (4).

$$Y = X\beta + \epsilon \quad (4)$$

Note that variables in the formula (4) are represented by the following formula (5).

$$Y = \begin{pmatrix} y_{AB1} \\ y_{AB2} \\ \vdots \\ y_{ABn} \end{pmatrix}, X = \begin{pmatrix} x_{AB1} & z_{AB1} & 1 \\ x_{AB2} & z_{AB2} & 1 \\ & \vdots & \\ x_{ABn} & z_{ABn} & 1 \end{pmatrix}, \beta = \begin{pmatrix} a \\ b \\ c \end{pmatrix}, \varepsilon = \begin{pmatrix} e_1 \\ e_2 \\ \vdots \\ e_n \end{pmatrix} \quad (5)$$

In the formula (5), ei represents a residual.
The following formula (6) represents a normal equation.

$$X^T Y = (X^T X)\beta \quad (6)$$

Accordingly, $\beta$ is represented by the following formula (7).

$$\beta = (X^T X)^{-1} X^T Y \quad (7)$$

As a result, the regression plane (y=ax+bx+c) may be obtained by computing constants a, b and c that have a minimum sum of squares of the residual ei utilizing the method of least squares. The plane estimating unit 141 acquires the constants a, b and c of the equation for the regression plane (y=ax+bz+c) as regression plane data.

Having completed the computation of the regression plane data, step S103 is processed.

Subsequently, a distance $D_{ABi}$ between the regression plane and the three-dimensional point group is computed in step S103. Specifically, the distance $D_{ABi}$ is obtained by computing a distance between the corresponding points $(x_{ABi}, y_{ABi}, z_{ABi})$ and the plane $(\alpha x + \beta y + \gamma z + \delta = 0)$ utilizing the following formula (8).

$$D_{ABi} = \frac{|\alpha x_{ABi} + \beta y_{ABi} + \gamma z_{ABi} + \delta|}{\sqrt{\alpha^2 + \beta^2 + \gamma^2}} \quad (8)$$

Having completed the computation of the distance between the regression plane data and each of the points of the three-dimensional point group, step S104 is processed.

In step S104, a distance $D_{MAX}$ having a maximum absolute value is extracted from the distances $D_{ABi}$ computed in step S103. Having completed the extraction of the maximum distance $D_{MAX}$, step S105 is processed.

In step S105, the distance $D_{MAX}$ is compared with a predetermined distance. If the maximum distance $D_{MAX}$ is the predetermined distance or less, step S106 is processed. If, on the other hand, the maximum distance D exceeds the predetermined distance, step S109 is processed. Note that the predetermined distance may be a value corresponding to a distance between the projection target and the image processing apparatus. Alternatively, the predetermined distance may be a value corresponding to depth of field (DOF).

In step S106, a proportion of the number of points of the three-dimensional point group existing in a predetermined range from a center of the imaged region to the number of points of the three-dimensional point group existing in an entire imaged region taken by the imaging unit 120 is computed. Having completed the computation of the proportion, step S107 is processed.

In step S107, the proportion computed in step S106 is compared with a predetermined proportion. If the proportion obtained as a result of the comparison exceeds the predetermined proportion, step S108 is processed. If, on the other hand, the proportion is the predetermined proportion or less, step S112 is processed. Note that the predetermined proportion may be a proportion to the entire imaged region within a predetermined range set in step S106. Alternatively, the predetermined proportion may be a proportion including the projection target residing in the center of the imaged region based on numeric computation or an experiment.

In steps S106 and S107, it is determined whether the three-dimensional point group extracted by the distance measuring unit 130 corresponds either to a point group representing a position on the surface of the projection target or a point group representing a position on a surface of a wall or the like located behind (i.e., backside) the projection target. Hence, in steps S106 and the like, whether the three-dimensional point group corresponds to one of the above point groups may be determined based on dispersion of the three-dimensional point group in addition to the comparison with the aforementioned predetermined proportion.

Specifically, dispersion of the three-dimensional point group on the surface of the projection target may be smaller than dispersion of the three-dimensional point group on the surface of the wall located behind the projection target. Thus, whether the three-dimensional point group corresponds to the point groups representing the position on the surface of the projection target may be determined based on whether the dispersion of the three-dimensional point group is less than or equal to a predetermined threshold. Note that the predetermined threshold may be determined based on numeric computation or an experiment.

Subsequently, in step S108, the computed regression plane (computed in step S102) is estimated as a plane corresponding to the projection target and stored as regression plane data. Thereafter, the estimation of the plane is terminated ("END" of FIG. 6).

In step S109, a point of the three-dimensional point group corresponding to the maximum distance $D_{MAX}$ is excluded from the three-dimensional point group. Having completed the exclusion of the point, step S110 is processed.

In step S110, it is determined whether the number of points of the three-dimensional point group is equal to or less than two. If the number of points of the three-dimensional point group exceeds two, step S101 is processed (back to step S101). If, on the other hand, the number of points of the three-dimensional point group is less than or equal to two, step S111 is processed.

In step S111, since the number of points of the three-dimensional point group is equal to or less than two, it may be difficult to estimate the plane. In this case, an error such as "plane estimating operation error" may be output. Thereafter, the plane estimating operation is terminated ("END" of FIG. 6).

In Step S112, the excluded point of the three-dimensional point group (i.e., the corresponding points) is input (registered) as the distance data, and step S101 is processed (back to step S101).

As described above, the image processing apparatus according to the embodiment is capable of measuring a distance from the image processing apparatus to the projection target and estimating a plane corresponding to the projection target based on the regression analysis. Further, the image processing apparatus according to the embodiment is capable of estimating a plane corresponding to the projection target by excluding the corresponding point located at a distance from the plane exceeding a predetermined distance when an obstacle is present between the image processing apparatus and the projection target or when a wall or the like is located close to the backside of the projection target.

Note that in the plane estimating operation, the corresponding point subject to exclusion is not limited to those associated with the projection target such as the obstacle or the wall behind the projection target; however, the corresponding point subject to exclusion may include those associated with objects other than the projection target.

Projectable Range Specifying Operation

An operation of the range specifying unit 143 (see FIG. 2) to specify a projectable range on the projection target is described with reference to FIGS. 7 to 12E.

FIGS. 7 to 9E are diagrams illustrating examples of the specification of the projectable range in a case where the projection target is located at a position distant from the wall or the like behind the projection target. FIGS. 10 to 11E are diagrams illustrating examples of the specification of the projectable range in a case where the projection target is located close to the wall or the like behind the projection target. FIGS. 12A to 12E are diagrams illustrating examples of the specification of the projectable range in a case where the projection target includes no frame (i.e., the projection target itself being the wall or the like).

Initially, the specification of the projectable range in a case where the projection target is located at a position distant from the wall or the like behind the projection target is described with reference to FIGS. 7 to 9E.

Figure 7:
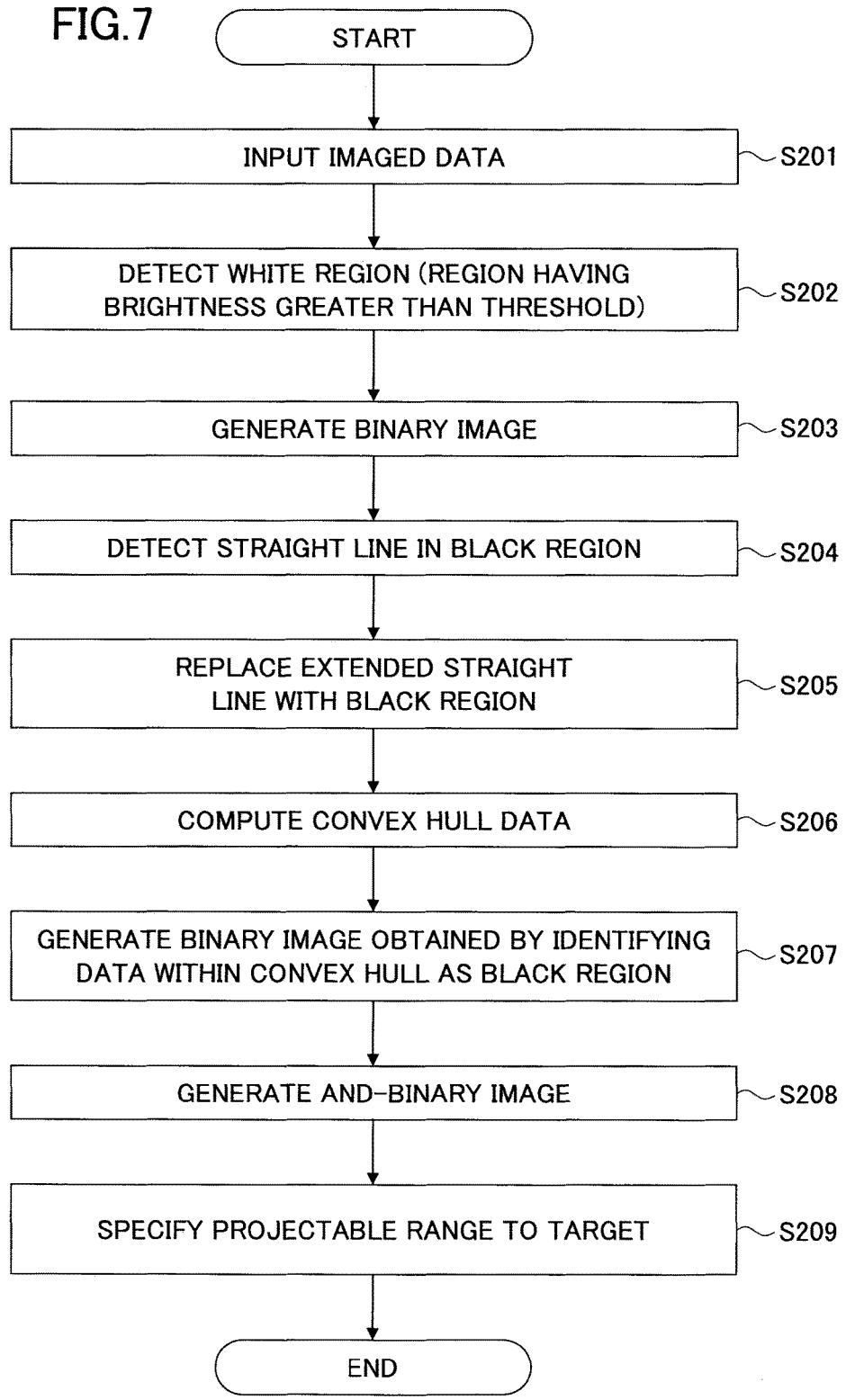
FIG. 7 is a flowchart illustrating examples of operations of an image generating unit and a range specifying unit.

FIG. 7 is a flowchart illustrating an example of a projectable range specifying operation.

In FIG. 7, the imaging unit 120 (see FIG. 2) takes an image of a region including the projection target to acquire imaged data (step S201). Having completed the taking of the image, the imaging unit 120 outputs the imaged data to the image generating unit 142 (see FIG. 2). Subsequently, step S202 is processed.

An operation of the imaging unit 120 (see FIG. 2) to image the projection target is specifically described below with reference to FIGS. 8 to 9E.

Figure 8:
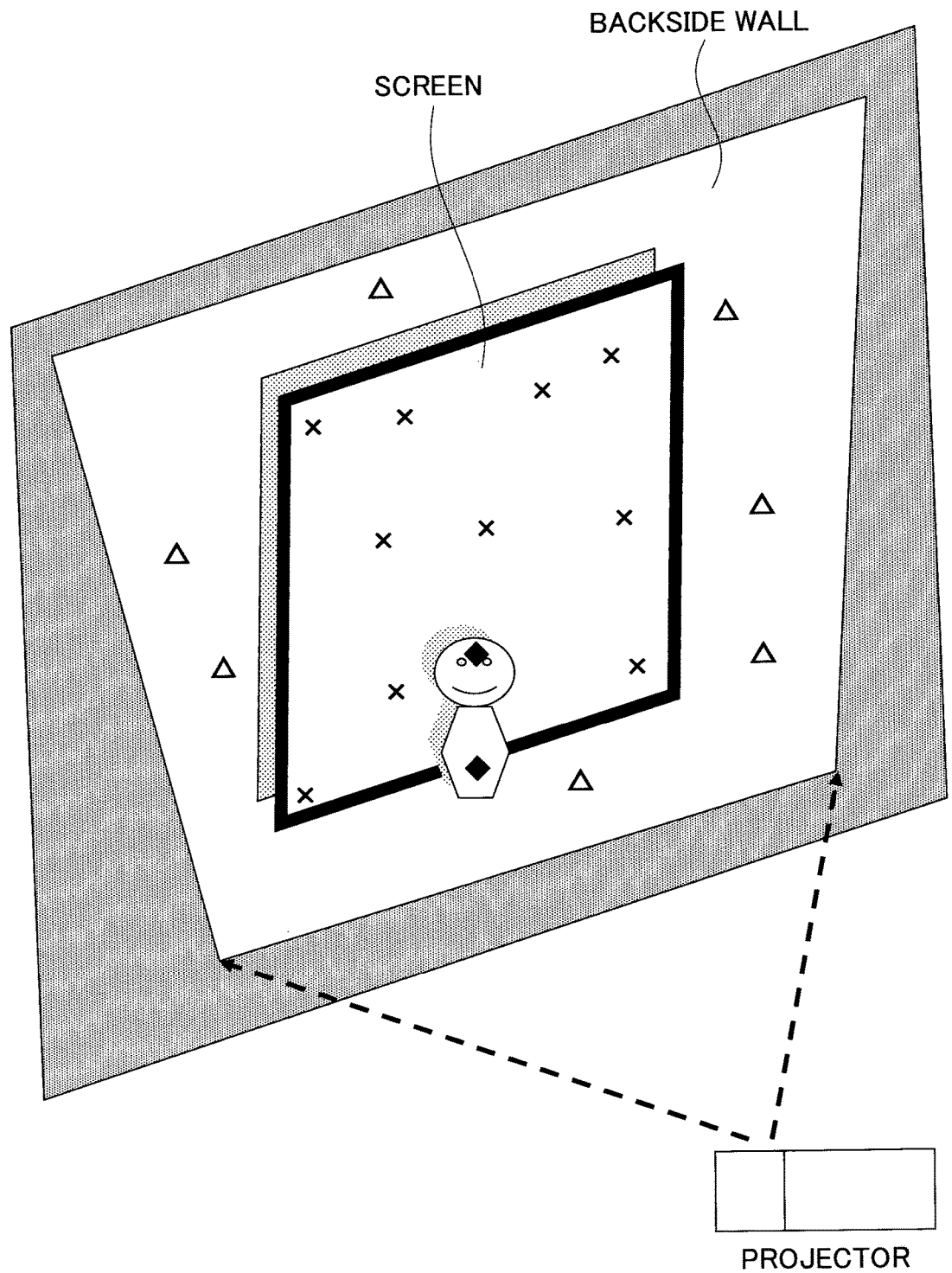
FIG. 8 is a diagram illustrating an example of an operation of imaging a projection target.

FIG. 8 is a diagram illustrating an example of an operation of imaging the projection target. In FIG. 8, "x" represents a position on the surface of the projection target. Likewise, "Δ" represents a position on the surface of the wall behind the projection target. Further, "♦" represents a position of a presenter.

In FIG. 8, the imaging unit 120 incorporated in a projector (i.e., a projecting unit) takes an image of the projection target (i.e., a screen) onto which light is projected by the projector. In this case, the projector projects an image of a white region onto an entire projectable region of the projection target. In this embodiment, the presenter stands between the projector and the projection target. Further, the projection target is located at a position distant from the wall behind the projection target.

Figure 9A:
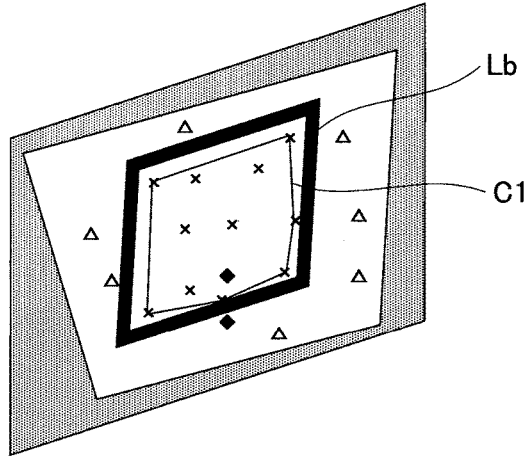
FIGS. 9A to 9E are diagrams illustrating examples of binary image processing.
Figure 9B:
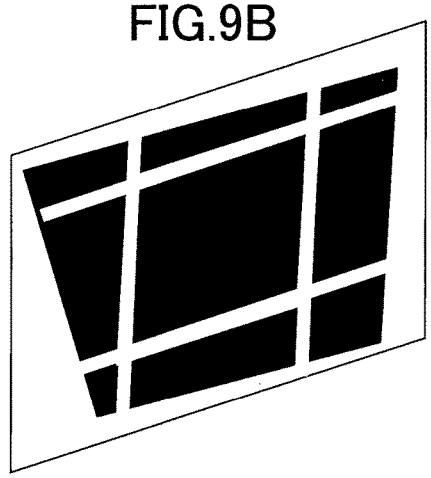
Figure 9C:
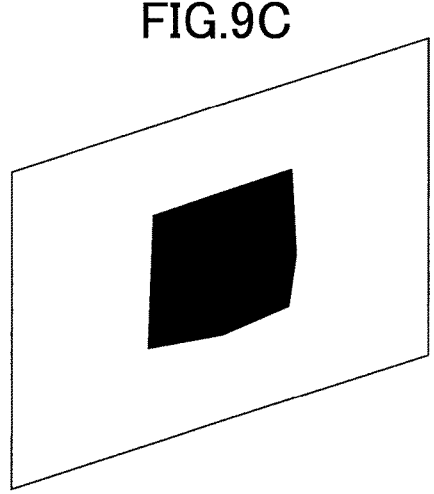
Figure 9D:
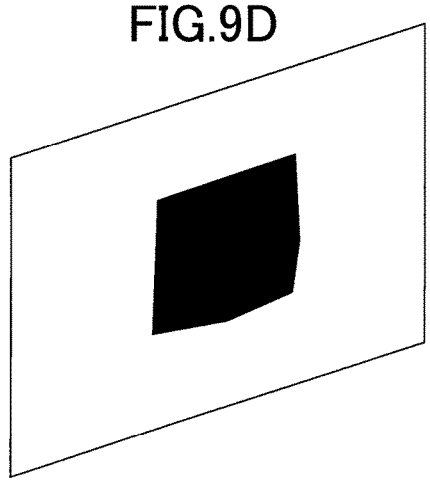
Figure 9E:
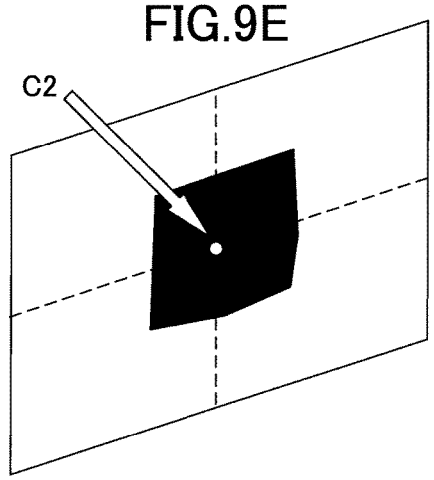
Figure 10:
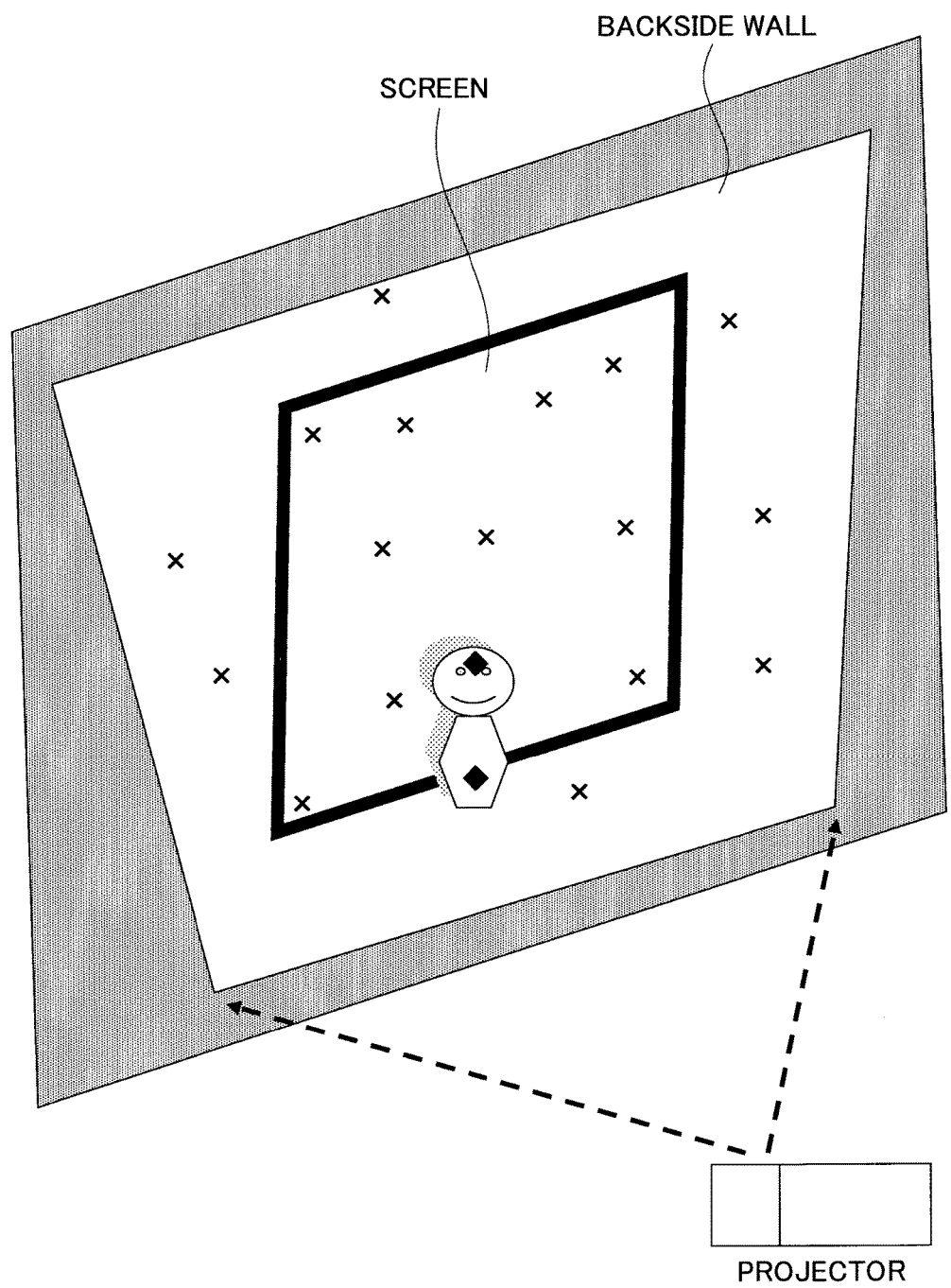
FIG. 10 is a diagram illustrating an example of an operation of imaging a projection target in a case where the projection target is adjacent to a wall situated at a backside of the projection target.

FIGS. 9A to 9E are diagrams illustrating an example of image processing for specifying the projectable range. FIG. 9A is a diagram illustrating an outline of an image taken in FIG. 8. FIG. 9B is a diagram illustrating an example of a binary image in which a straight line component is extended. FIG. 9C is a diagram illustrating an example of a binary image in which an internal region within the later-described convex hull is defined as a black region. FIG. 9D is a diagram illustrating an example of a binary image in which the black region remains as the black region and a region other than the black region is converted into a white region in a manner similar to FIGS. 9B and 9C. FIG. 9E is a diagram illustrating an example of a binary image in which a black region including a center of a projected image is selected. FIGS. 9A to 9E illustrate details of respective steps corresponding to those of the flowchart illustrated in FIG. 7.

Next, in step S202 of FIG. 7, the image generating unit 142 (see FIG. 2) generates image data of a region including the projection target based on the imaged data (see FIG. 9A) output from the imaging unit 120. In this case, the image generating unit 142 detects a white region from the generated image data.

Note that the image generating unit 142 may be configured to detect a region having brightness greater than a predetermined threshold as the white region. The predetermined threshold may be a median value between a maximum value and a minimum value of the brightness (luminance) of the imaged image, or may be a value corresponding to a distance from the image processing apparatus to the projection target. Alternatively, the predetermined threshold may be determined based on numeric computation or an experiment. Specifically, the white region corresponds to a region marked with "x" and "Δ" in FIGS. 8 and 9A.

Note that the predetermined threshold may be determined based on color components in place of the aforementioned brightness (luminance). For example, if the predetermined threshold is determined based on an "R" component of RGB, the white region may clearly be distinguished despite the fact that the frame is a green-oriented color. Further, the predetermined threshold may be determined by measuring edge strength of each of pixels, averaging the brightness of the pixels having the high edge strength, and determining the obtained average as the predetermined threshold. The edge strength may be measured by applying a spatial filter illustrated in TABLE 1 to a noted pixel and its neighboring pixels and acquiring their absolute values.

TABLE 1

| -1 | -1 | -1 |
| -1 | 8  | -1 |
| -1 | -1 | -1 |

Having completed the detection of the white region, step S203 is processed.

In step S203, the image generating unit 142 generates a binary image composed of white in an area detected as the white region and black in an area other than the white area detected as the black region based on the result detected in step S202. Having completed the generation of the binary image, step S204 is processed.

In step S204, the image generating unit 142 detects a straight line component in the black region. Having completed the detection of the straight line component, step S205 is processed.

In step S205, the image generating unit 142 performs image processing on the binary image to change extended parts (extended lines) of the straight line component into black in the black region detected in step S204. Further, having changed the extended parts (extended lines) of the straight line component into black in the binary image, the white region and black region of the binary image are inversed. Specifically, when a straight line component Lb in FIG. 9A is detected, a binary image having extended parts (extended lines) of the straight line component Lb that are changed in the white region is generated in FIG. 9B. Having completed the generation of the above binary image, step S206 is processed.

In step S206, the image generating unit 142 computes convex hull data based on the distance data computed by the distance measuring unit 130 and the regression plane data estimated by the plane estimating unit 141.

Specifically, the plane estimating unit 141 estimates a plane including corresponding points marked as "x" in FIG. 9A. Subsequently, the image generating unit 142 extracts plural corresponding points in the plane estimated by the plane estimating unit 141 based on the distance data computed by the distance measuring unit 130. Further, the image generating unit 142 computes convex hull data associated with a polygon having a minimum area (the polygon having a minimum area is hereinafter referred to as a "convex hull") encompassing (covering) the extracted corresponding points. In this case, the convex hull indicates a convex hull C1 encompassing (covering) "x" marks illustrated in FIG. 9A.

Having completed the computation of the convex hull data, step S207 is processed.

In step S207, the image generating unit 142 generates a binary image having an internal region within the convex hull C1 as the black region (FIG. 9C). Note that the binary image having the internal region within the convex hull C1 as the black region is generated based on the distance from the image processing apparatus to the projection target and the estimated plane. Hence, the binary image may be generated without being affected by levels of the brightness of the projected light or unevenness of the surface of the projection target.

Thereafter, having output the binary image having the extended straight line component Lb generated in step S205 (FIG. 9B) and the binary image of the convex hull C1 generated in step S207 (FIG. 9C) to the range specifying unit 143 (see FIG. 2), step S208 is processed.

In step S208, the range specifying unit 143 compares the binary image (FIG. 9B) having the extended straight line component Lb with the binary image (FIG. 9C) of the convex hull C1, and carries out binary image processing on both binary images (i.e., FIGS. 9B and 9C) so as to determine a region in black as a black region and convert a region other than the black region into a white region (FIG. 9D). Thereafter, step S209 is processed.

In step S209, when the black region (FIG. 9D) of the binary image generated in step S208 includes a central point (C2 in FIG. 9E) of a projected region of the projection target, the range specifying unit 143 specifies the black region as the projectable range of the projection target. Thereafter, the projectable range specifying operation is terminated ("END" of FIG. 7).

Note that the central point C2 may be a point (i.e., a position on the surface of the projection target) utilized by the projector when the projector adjusts a focus.

As described above, the image processing apparatus according to the embodiment is capable of computing the convex hull data associated with the projection target by measuring the distance from the image processing apparatus to the projection target and estimating the plane corresponding to the projection target, and generating the binary image based on the convex hull data. Hence, the image processing apparatus may be capable of generating the binary image without being affected by levels of the brightness of the projected light or unevenness of the surface of the projection target. Moreover, the image processing apparatus 100 according to the embodiment may be capable of specifying the projectable range on the projection target by estimating the plane corresponding to the projection target when the presenter stands between the projector and the projection target.

Next, a case where the projection target is located at a position close to a wall and the like behind the projection target is described with reference to FIGS. 10 to 11E.

FIG. 10 is a diagram illustrating an example of an operation of imaging the projection target. In FIG. 10, "x" represents a position on the surface of the projection target as well as on the surface of the wall behind the projection target. Further, "♦" represents a position of the presenter standing between the projector and the projection target.

In FIG. 10, the imaging unit 120 incorporated in the projector takes an image of the projection target (i.e., a screen) onto which light is projected by the projector. In this case, the projector projects an image of a white region onto an entire projectable region of the projection target.

Figure 11A:
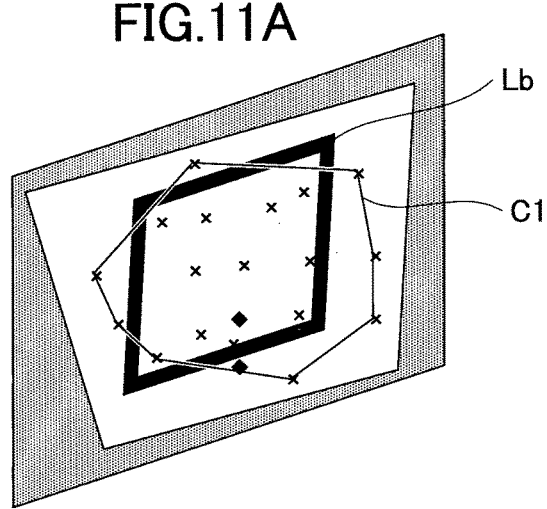
FIGS. 11A to 11E are diagrams illustrating examples of binary image processing in a case where a projection target is adjacent to a wall situated at a backside of the projection target.
Figure 11B:
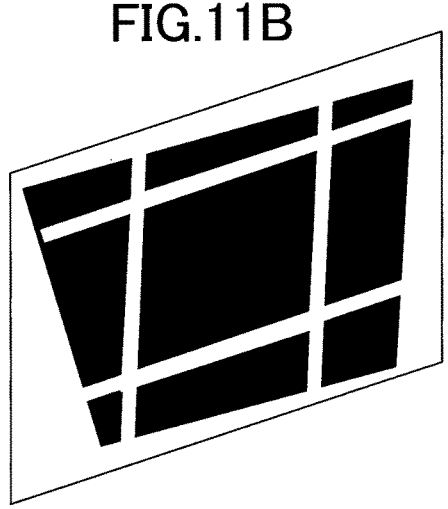
Figure 11C:
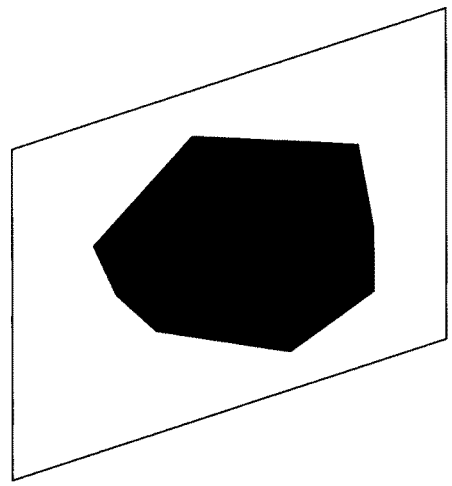
Figure 11D:
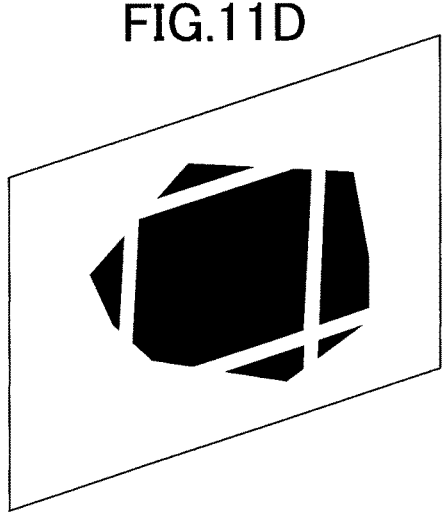
Figure 11E:
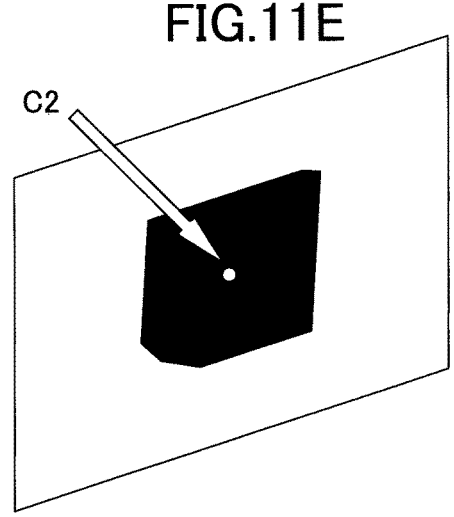

FIGS. 11A to 11E are diagrams illustrating an example of image processing for specifying the projectable range. FIG. 11A is a diagram illustrating an outline of an image taken in FIG. 10. FIG. 11B is a diagram illustrating an example of a binary image in which a straight line component is extended. FIG. 11C is a diagram illustrating an example of a binary image in which an internal region within a convex hull is defined as a black region. FIG. 11D is a diagram illustrating an example of a binary image in which a region in black is determined as the black region and a region other than the black region is converted into a white region in a manner similar to FIGS. 11B and 11C. FIG. 11E is a diagram illustrating an example of a binary image in which a black region including a center of a projected image is selected.

In FIG. 11A, the image generating unit 142 computes convex hull data based on distance data computed by the distance measuring unit 130 and regression plane data estimated by the plane estimating unit 141. Specifically, the plane estimating unit 141 estimates the plane including "x" marks illustrated in FIG. 11A. Subsequently, the image generating unit 142 extracts plural corresponding points in the plane estimated by the plane estimating unit 141 based on the distance data computed by the distance measuring unit 130.

In this case, the image generating unit 142 extracts a convex hull C1 including "x" marks illustrated in FIG. 11A. Thus, the image generating unit 142 extracts the convex hull C1 exceeding the projectable range (i.e., defined by a frame formed of the straight line component Lb in FIG. 11A) on the projection target.

Subsequently, the image generating unit 142 generates a binary image having an internal region within the convex hull C1 as the black region (FIG. 11C). Further, the range specifying unit 143 compares the binary image (FIG. 11B) having the extended straight line component Lb with the binary image (FIG. 11C) of the convex hull C1, and carries out binary image processing on both binary images (i.e., FIGS. 11B and 11C) so as to determine a region in black as a black region and convert a region other than the black region into a white region (FIG. 11D).

Subsequently, in FIG. 11E, the range specifying unit 143 selects a black region of the binary image including a central point (C2 in FIG. 11E) of a projected image. In this case, the range specifying unit 143 specifies the selected black region as the projectable range on the projection target.

Thereafter, the projectable range specifying operation is terminated.

As described above, the image processing apparatus 100 according to the embodiment may be capable of specifying the projectable range on the projection target in a case where the projection target is located at a position close to the wall or the like behind the projection target.

Next, a case where the projection target includes no frame is described with reference to FIGS. 12A to 12E.

Figure 12A:
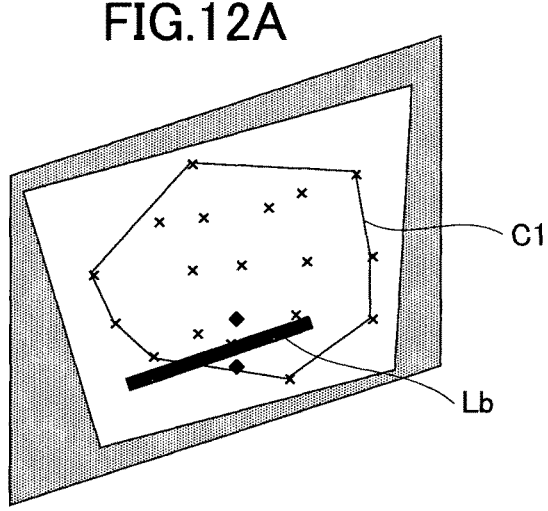
FIGS. 12A to 12E are diagrams illustrating examples of binary image processing in a case where a projection target includes no frame.
Figure 12B:
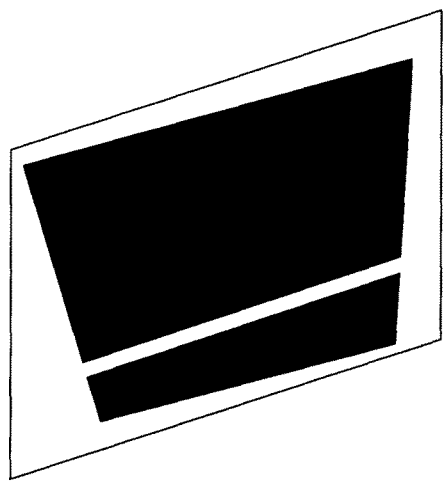
Figure 12C:
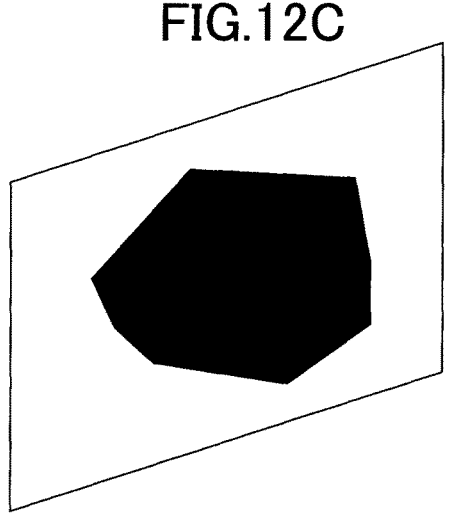
Figure 12D:
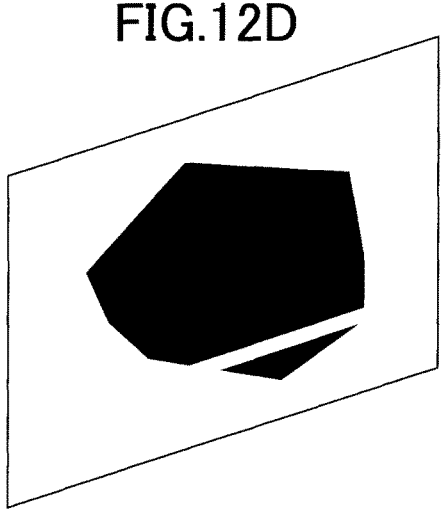
Figure 12E:
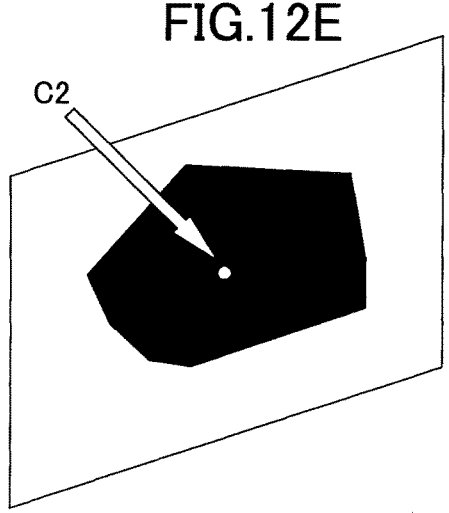

FIGS. 12A to 12E are diagrams illustrating an example of image processing for specifying the projectable range. FIG. 12A is a diagram illustrating an outline of an image to be taken. FIG. 12B is a diagram illustrating an example of a binary image in which a straight line component is extended. FIG. 12C is a diagram illustrating an example of a binary image in which an internal region within a convex hull is defined as a black region. FIG. 12D is a diagram illustrating an example of a binary image in which a region in black is determined as a black region and a region other than the black region is converted into a white region in a manner similar to FIGS. 12B and 12C. FIG. 12E is a diagram illustrating an example of a binary image in which a black region including a center of a projected image is selected.

In FIG. 12A, "x" represents a position on the surface of the projection target as well as on the surface of the wall behind the projection target. Further, "♦" represents a position of the presenter.

In FIG. 12A, the image generating unit 142 detects a straight line component in the black region. Thereafter, the image generating unit 142 performs image processing on the binary image to change the extended parts (extended lines) of the straight line component into black in the detected black region. Further, having changed the extended parts (extended lines) of the straight line component into black in the binary image, the white region and black region of the binary image are inversed (FIG. 12B).

In FIG. 12A, the image generating unit 142 computes convex hull data based on distance data computed by the distance measuring unit 130 and regression plane data estimated by the plane estimating unit 141. In this process, the plane estimating unit 141 estimates the plane including "x" marks illustrated in FIG. 12A. Subsequently, the image generating unit 142 extracts plural corresponding points in the plane estimated by the plane estimating unit 141 based on the distance data computed by the distance measuring unit 130. In this process, the image generating unit 142 extracts a convex hull C1 including "x" marks illustrated in FIG. 12A.

Thereafter, the image generating unit 142 generates a binary image based on the extracted convex hull C1 (FIG. 12C).

Subsequently, the range specifying unit 143 compares the binary image (FIG. 12B) having the extended straight line component Lb with the binary image (FIG. 12C) of the convex hull C1, and carries out binary image processing on both binary images (i.e., FIGS. 12B and 12C) so as to determine a region in black as a black region and convert a region other than the black region into a white region (FIG. 12D).

Subsequently, in FIG. 12E, the range specifying unit 143 selects a black region of the binary image including a central point C2 of a projected image. In this process, the range specifying unit 143 specifies the selected black region as the projectable range on the projection target.

Thereafter, the projectable range specifying operation is terminated.

As described above, the image processing apparatus 100 according to the embodiment may be capable of specifying the projectable range on the projection target in a case where light is directly projected onto the projection target such as a wall.

Program and Non-Transitory Recording Medium Storing Program

A program Pr according to an embodiment may, when processed by a processor, cause a computer to execute: imaging a region including the surface of the projection target to acquire imaged data; computing distance data associated with a distance between the projection target and a position at which the projection target is imaged based on the imaged data; estimating a plane corresponding to the projection target based on the computed distance data; generating image data associated with the region based on the imaged data; and specifying a projectable range on the projection target based on the image data and information associated with the plane.

In this configuration, effects similar to those obtained by the image processing apparatus according to the embodiment may be obtained.

Further, the program Pr according to the embodiment may be recorded on a non-transitory computer readable recording medium Md. Examples of the recording medium Md recording the program Pr may include computer readable media such as a flexible disk, a CD-ROM, and a memory card.

EMBODIMENTS

In the following, an image processing apparatus and an image processing method according to the embodiment are described with reference to embodiments of a projector.

The image processing apparatus and the like according to the embodiment is not limited to those applied to the projector. The image processing apparatus and the like according to the embodiment may be applied to any devices other than the projector insofar as the devices are capable of imaging a projection target and specifying a range on the projection target.

First Embodiment

A projector according to a first embodiment is described below.

Configuration of Projector

The projector is a device that projects an image. The projector according to the first embodiment include an IF unit, a projecting unit, an autofocus unit, and a projecting image generating unit. The projector further includes a control unit, an imaging unit, a distance measuring unit, a plane estimating unit, an image generating unit and a range specifying unit.

The projector is configured to project an image on a projection target, take an image of a region including the projection target and estimate a plane corresponding to the projection target. The projector is further configured to adjust a focus of a projection-specific lens, specify a projectable range on the projection target and correct the projected image such as keynote correction.

Note that the IF unit is configured to input external information into the projector or output the information from the projector. The projecting unit is configured to project an image onto the projection target from the projecting-specific lens of the projector. The projecting image generating unit is configured to generate an image projected by the projector. The autofocus unit is configured to adjust a focus of the projecting-specific lens of the projector on the projection target.

A control unit and the like of the image processing apparatus are similar to those described with reference to FIG. 1, and their descriptions are thus omitted.

Figure 13:
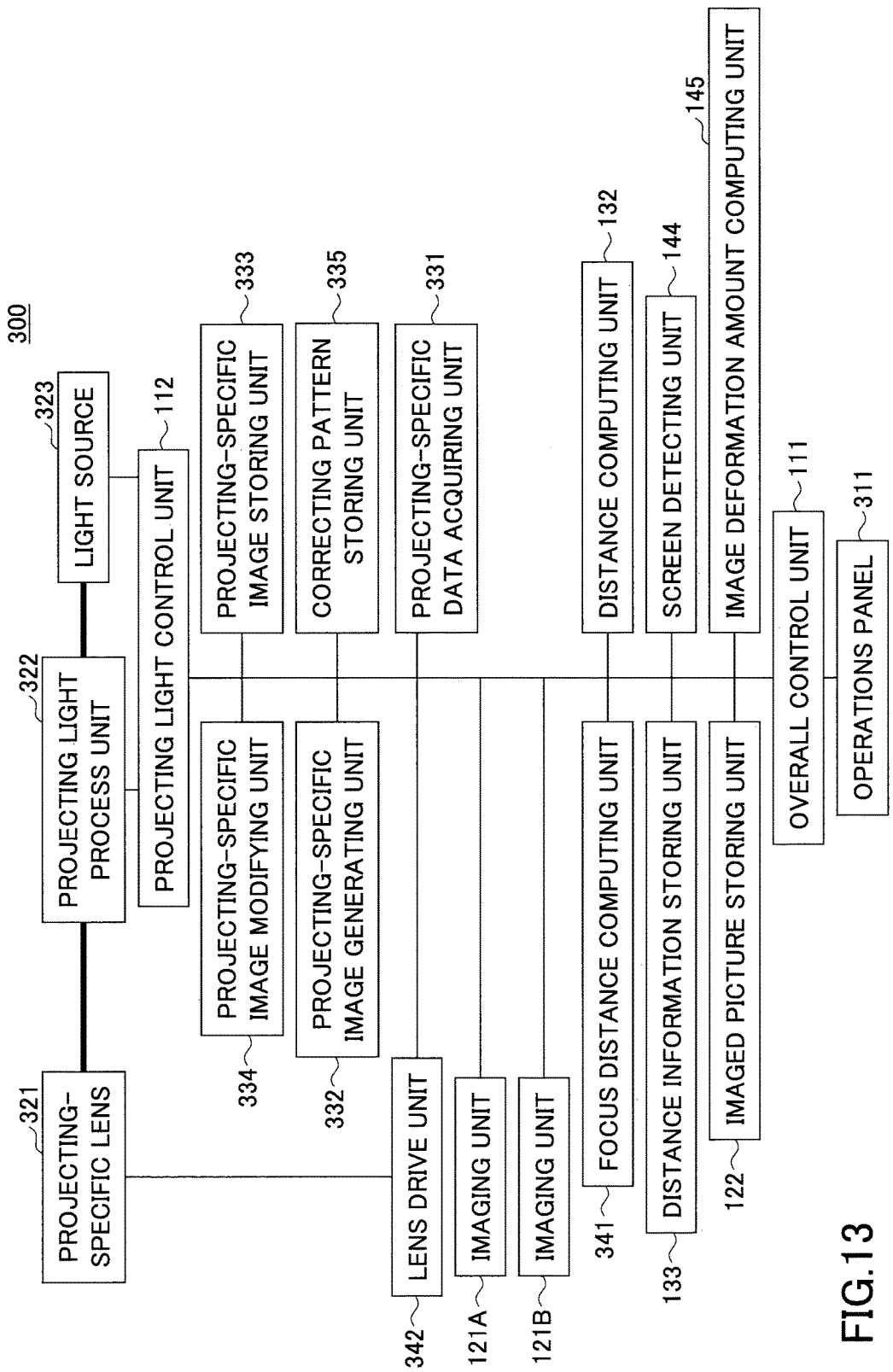
FIG. 13 is a schematic configuration diagram illustrating a projector according to a first embodiment.

FIG. 13 is a schematic diagram illustrating the projector according to the embodiment.

In FIG. 13, a projector 300 includes an operations panel 311 as the IF unit. The projector 300 further includes a projecting-specific lens 321, a projecting light process unit 322, a light source 323 and the like as the projecting unit. The projector 300 further includes a projecting-specific data acquiring unit 331, a projecting-specific image generating unit 332, a projecting-specific image storing unit 333, a projecting-specific image modifying unit 334, a correction pattern storing unit 335 and the like as the projecting image generating unit. The projector 300 further includes a focus distance computing unit 341 and a lens drive unit 342 and the like as the autofocus unit AF.

The projector 300 further includes an overall control unit 111 and a projecting light control unit 112 as the control unit. The projector 300 further includes a first imaging unit 121A, a second imaging unit 121B, and an imaged picture storing unit 122 as the imaging unit. The projector 300 further includes a distance computing unit 132 and a distance information storing unit 133 as the distance measuring unit. The projector 300 further includes a screen detecting unit 144 and an image deformation amount computing unit 145 as the plane estimating unit, the image generating unit and the range specifying unit.

Projection Correcting Operation

An operation of the projector 300 (see FIG. 13) to correct a projected image is described with reference to FIG. 14.

Figure 14:
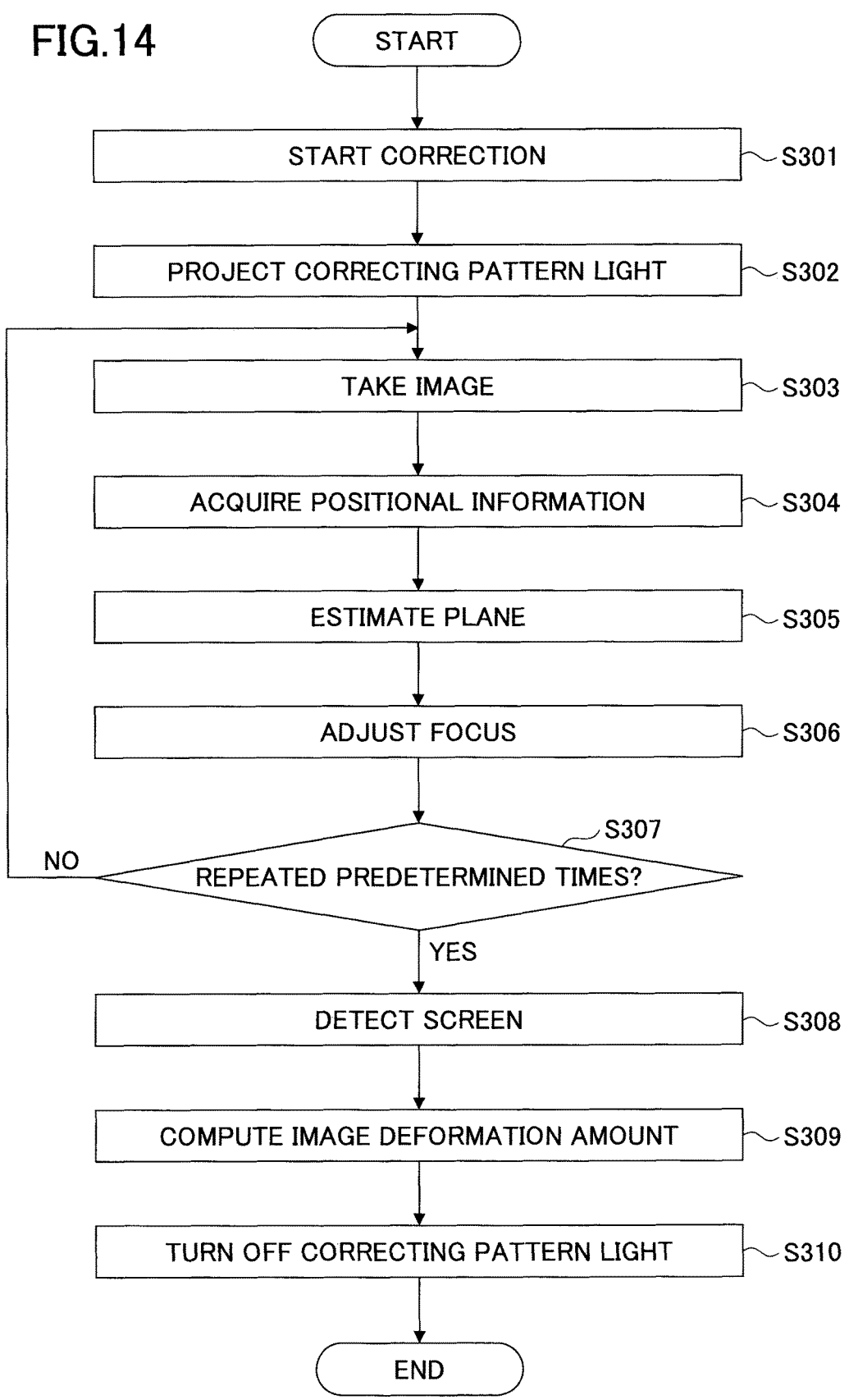
FIG. 14 is a flowchart illustrating an example of a procedure for specifying a projection target according to the first embodiment.

FIG. 14 is a flowchart illustrating an example of a procedure for projecting an image performed by the projector 300 according to the first embodiment.

As illustrated in FIG. 14, in step S301, the overall control unit 111 (see FIG. 3) outputs instructions to the projection unit and the like via input from the operations panel 311 for initiating a correcting operation. Subsequently, step S302 is processed.

In step S302, the projecting unit projects a correcting pattern stored in a correction pattern storing unit onto the projection target via a projecting-specific lens. Subsequently, step S303 is processed.

In FIG. 303, the imaging unit causes the first and the second imaging units 121A and 121B to take an image of a region including the projection target to store imaged data in the imaged picture storing unit 122. Having completed the storage of the imaged images, step S304 is processed.

In step S304, the distance measuring unit causes the distance computing unit 132 to compute a distance from the projector 300 to the projection target to store the computed result in the distance information storing unit 133. Note that a method for computing the aforementioned distance is the same as those described in the aforementioned "CORRESPONDING POINT EXTRACTING OPERATION" and the "DISTANCE DATA COMPUTING OPERATION" and the description of the method is thus omitted. Having completed the storage of the computed result, step S305 is processed.

In step S305, the range specifying unit or the like causes the screen detecting unit 144 to estimate a plane corresponding to the projection target. Note that a method for estimating the plane is the same as that described in the aforementioned "PLANE ESTIMATING OPERATION" and the description of the method is thus omitted. Having completed the estimation of the plane, step S306 is processed.

In step S306, the autofocus unit AF causes the focus distance computing unit 341 to compute a distance associated with a focus base on the distance data computed by the distance computing unit 132 (step S304) and/or information associated with the estimated plane (step S305) to adjust a focus of the projecting-specific lens 321 by moving the projecting-specific lens 321, thereby adjusting a focus on the projected image.

Note that a method for adjusting a focus may include causing the distance measuring unit to compute distance data associated with the distance from the projector 300 to a central position of the projected region of the projection target and adjusting the focus based on the computed distance data. The central position may be determined as a mean of a point representing a maximum value and a point representing a minimum value of x coordinate and a mean of a point representing a maximum value and a point representing a minimum value of z coordinate of the three-dimensional point group. Alternatively, the central position may be determined as a mean of all the points of the three-dimensional point group.

Having completed the adjustment of the focus, step S307 is processed.

In step S307, the overall control unit 111 determines whether the number of times the autofocus unit AF has adjusted the focus is greater than or equal to a predetermined number of times. If the number of times the autofocus unit AF has adjusted the focus is greater than or equal to the predetermined number of times, step S308 is processed. If, on the other hand, the number of times the autofocus unit AF has adjusted the focus is less than the predetermined number of times, step S303 is processed (back to step S303).

Note that the autofocus unit AF adjusts the focus the predetermined times because the distance data measured by the distance measuring unit includes errors due to the fact that the distance measuring unit measures the distance from the projector 300 to the projection target when the autofocus unit AF is not in a focused state (i.e., the focus is not adjusted). Note that the predetermined number of times may be determined based on numeric computation or an experiment. Further, in a case of repeating the focus adjustment, the repetition of the focus adjustment may be terminated when displacement of the distance measured by the distance measuring unit is a predetermined threshold or less.

Next, in step S308, the range specifying unit or the like causes the screen detecting unit 144 to specify a projectable range. Note that a method for specifying the projectable range is the same as that described in the aforementioned "PROJECTABLE RANGE SPECIFYING OPERATION" and the description of the method is thus omitted. Having completed the specification of the projectable range, step S309 is processed.

In step S309, the range specifying unit causes the image deformation amount computing unit 145 to compute a deformation amount of the image. Note that a method for computing the deformation amount of the image includes computing information associated with projected image correction (e.g., enlarging, reducing, and keystone correction) so as to project an image onto the projectable range detected in step S308 in a quadrilateral form (e.g., rectangular or square). Having completed the computation of the information, step S310 is processed.

Thereafter, the projectable range specifying operation is terminated ("END" of FIG. 7).

Second Embodiment

A projector according to a second embodiment is described below.

Configuration of Projector

Figure 15:
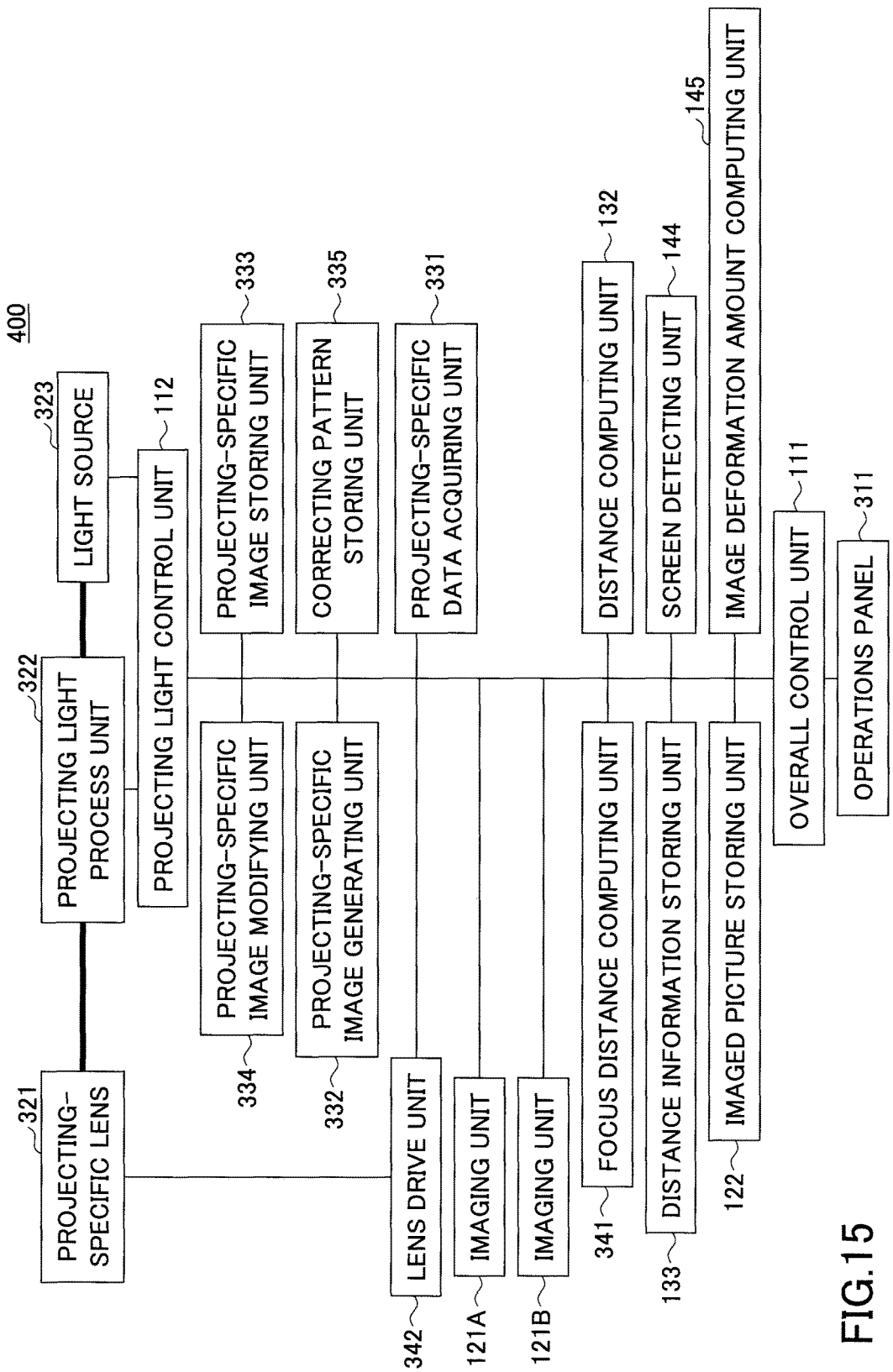
FIG. 15 is a schematic configuration diagram illustrating a projector according to a second embodiment.

FIG. 15 is a schematic diagram illustrating the projector according to the second embodiment.

In FIG. 15, a configuration of a projector 400 is similar to that of the first embodiment illustrated in FIG. 13, and description of the configuration of the projector 400 is thus omitted.

Projection Correcting Operation while in Use

An operation of the projector to adjust a focus or the like when the projection target or the projector is moved while light is projected onto the projection target is described with reference to FIG. 16.

Figure 16:
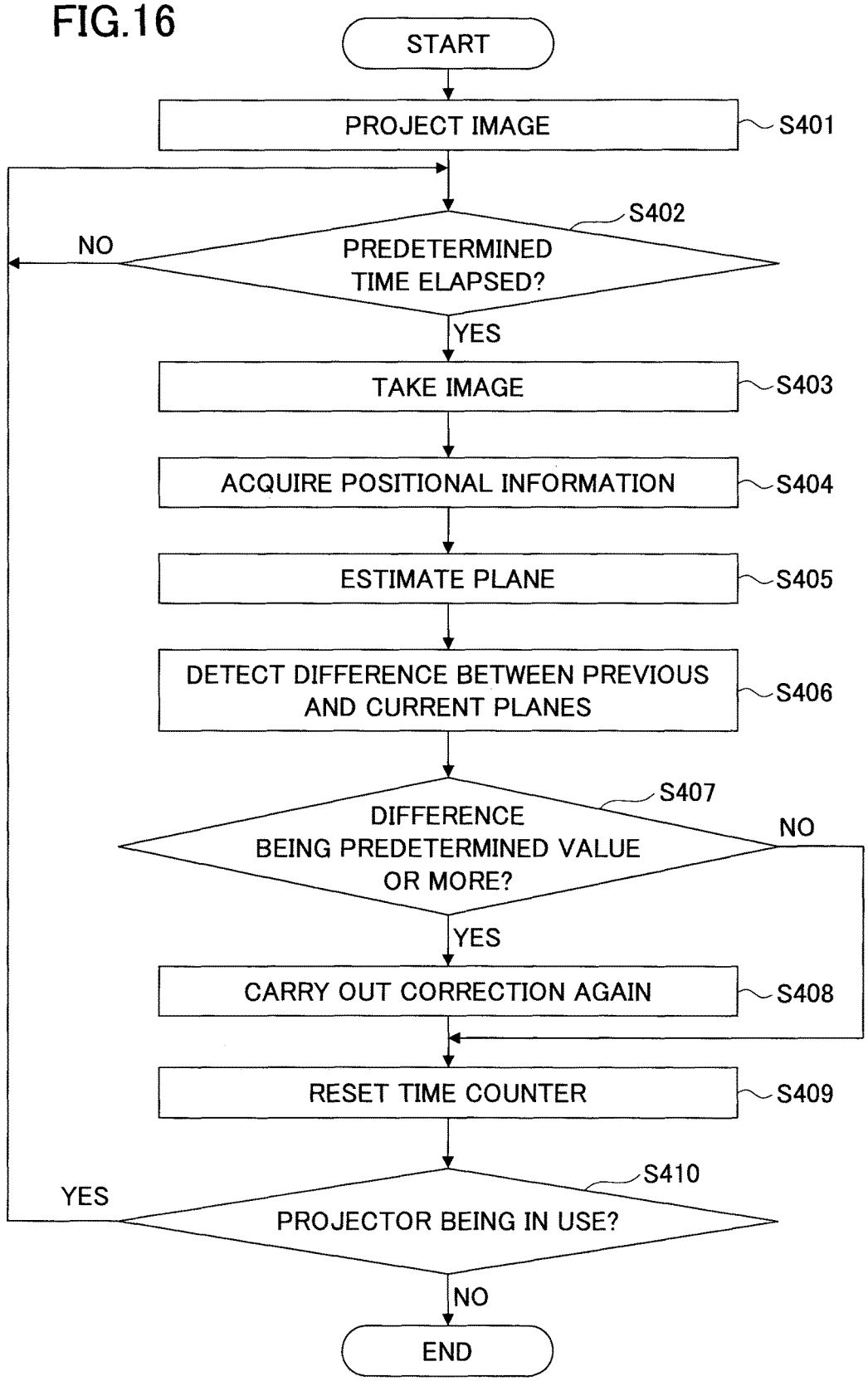
FIG. 16 is a flowchart illustrating an example of a procedure for specifying a projection target according to the second embodiment.

FIG. 16 is a flowchart illustrating an example of a procedure for adjusting a focus or the like performed by the projector 400 according to the second embodiment.

In step S401 of FIG. 16, the projecting unit projects a projecting-specific image stored in a projecting-specific image storing unit 333 onto the projection target via a projecting-specific lens 321. Subsequently, step S402 is processed.

In step S402, an overall control unit 111 causes a time counter for measuring a predetermined time to determine whether a predetermined time has elapsed. Having the predetermined time elapse, step S403 is processed. If the predetermined time has not yet elapsed, the overall control unit 111 waits until the predetermined time has elapsed.

In step S403, the imaging unit causes the first and the second imaging units 121A and 121B to take an image of a region including the projection target to store imaged data in the imaged picture storing unit 122. Having completed the storage of the imaged images, step S404 is processed.

In step S404, the distance measuring unit causes the distance computing unit 132 to compute a distance from the projector 400 to the projection target to store the computed result in the distance information storing unit 133. Note that a method for computing the aforementioned distance is the same as those described in the "CORRESPONDING POINT EXTRACTING OPERATION" and the "DISTANCE DATA COMPUTING OPERATION" and the description of the method is thus omitted. Having completed the storage of the computed result, step S405 is processed.

In step S405, the range specifying unit or the like causes the screen detecting unit 144 to estimate a plane corresponding to the projection target. Note that a method for estimating the plane is the same as that described in the "PLANE ESTIMATING OPERATION" and the description of the method is thus omitted. Having completed the estimation of the plane, step S406 is processed.

In step S406, the range specifying unit or the like compares the plane estimated in step S405 with the previously estimated plane (or plane estimated at startup of the projector) to compute a difference between positions of the two estimated planes. The difference between the positions of the two estimated planes may be determined as a difference between normal vectors of the two estimated planes (square-root of sum of squares).

Note that the plane estimated in step S405 is represented by the following formula (9).

$$y = ax + bz + c \quad (9)$$

The previously estimated plane (or the plane estimated at the startup of the projector) is represented by the following formula (10).

$$y = a_0 x + b_0 z + c_0 \quad (10)$$

In this case, the normal vector of the estimated plane is represented by the following formula (11).

$$(a, -1, b), (a_0, -1, b_0) \quad (11)$$

Having completed the computation of the difference between the positions of the planes, step S407 is processed.

In step S407, the range specifying unit 143 determines that the projection target or the like has moved when the difference between the positions of the planes is greater than or equal to a predetermined value. Note that the predetermined value may be a value corresponding to a distance between the projection target and the projector. Alternatively, the predetermined value may be a value corresponding to depth of field (DOF).

If the difference between the positions of the planes is greater than or equal to the predetermined value, step S408 is processed. If, on the other hand, the difference between the positions of the planes is less than the predetermined value, step S409 is processed.

In step S408, the projector performs a correcting operation similar to that performed at the startup of the projector. Specifically, the projector performs the correcting operation similar to that performed in the first embodiment (i.e., steps S303 through S309 in FIG. 14). Having completed the correcting operation, step S409 is processed.

In step S409, the overall control unit 111 resets the time counter and initializes the measurement of the predetermined time. Thereafter step S410 is processed.

Further, in step S410, the overall control unit 111 determines whether the projector is currently in use. If the projector is currently in use, step S402 is processed (back to step S402). If, on the other hand, the projector is not currently in use, the focus adjusting operation is terminated ("END" of FIG. 16).

Third Embodiment

A projector according to a third embodiment is described below.

Configuration of Projector

Figure 17:
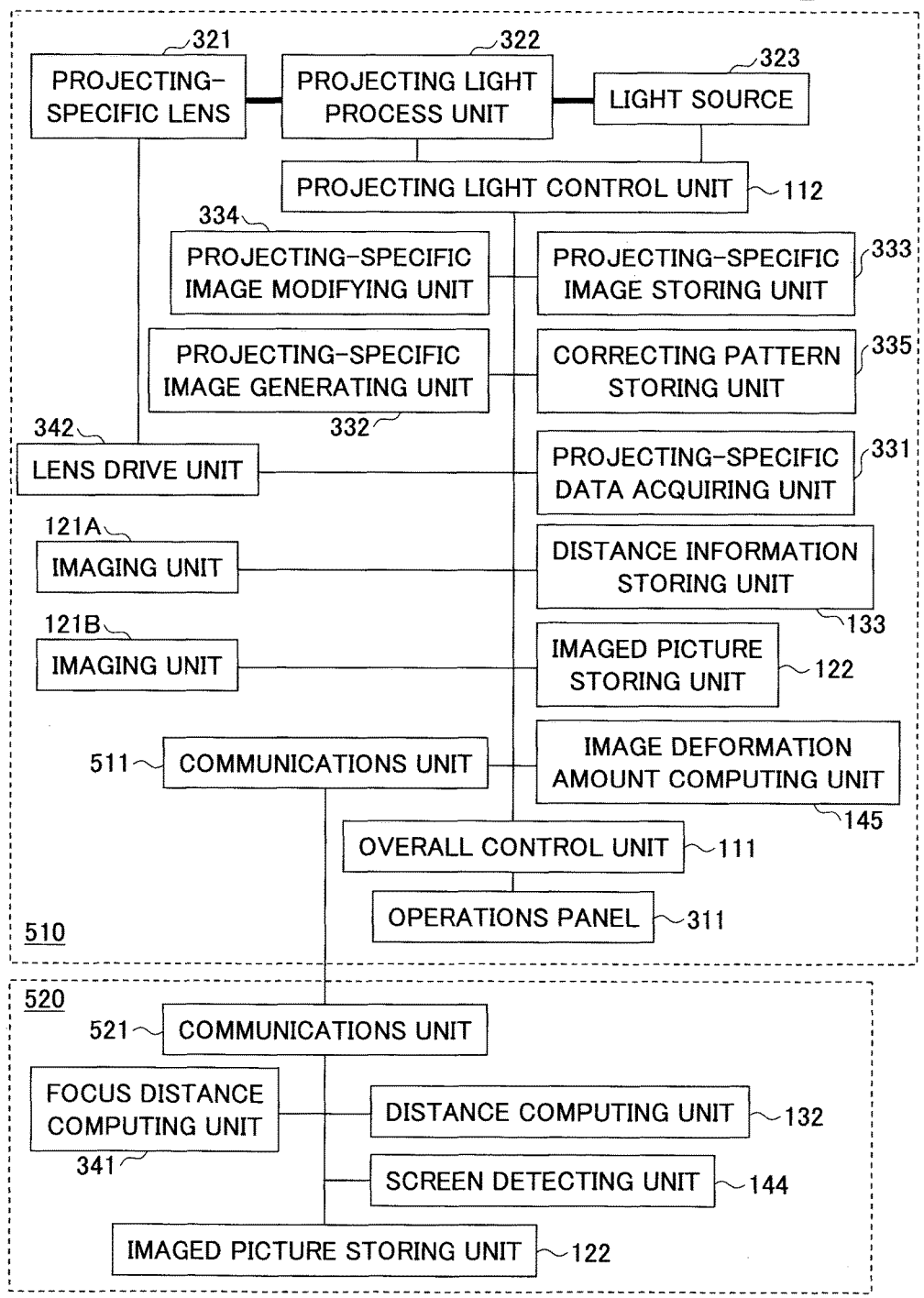
FIG. 17 is a schematic configuration diagram illustrating a projector system employed according to a third embodiment.

FIG. 17 is a schematic diagram illustrating a projector system according to the third embodiment.

In FIG. 17, a projector system 500 includes a projector 510 and an external processing unit 520. The basic configuration of the projector 510 is similar to those illustrated in the first and the second embodiments, and description of the configuration of the projector 510 is thus omitted.

The projector 510 according to the third embodiment includes a communications unit 511. Similarly, the external processing unit 520 includes a communications unit 521. The projector 510 and the external processing unit 520 are mutually communicable via the communications units 511 and 521 by wired or wireless connections. The external processing unit 520 may utilize cloud computing, or the like.

The external processing unit 520 includes a focus distance computing unit 341, a distance computing unit 132, a screen detecting unit 144 and an imaged picture storing unit 122. The external processing unit 520 carries out arithmetic processing such as distance computation, screen detection, focus adjustment and computation of information associated with the focus adjustment based on information output from the projector 510.

Since the projector system 500 is capable of reducing a processing amount of the projector 510, the projector 510 may be reduced in size and weight, and the configuration of the projector 510 may be simplified.

Fourth Embodiment

A projector according to a fourth embodiment is described below.

Configuration of Projector

Figure 18:
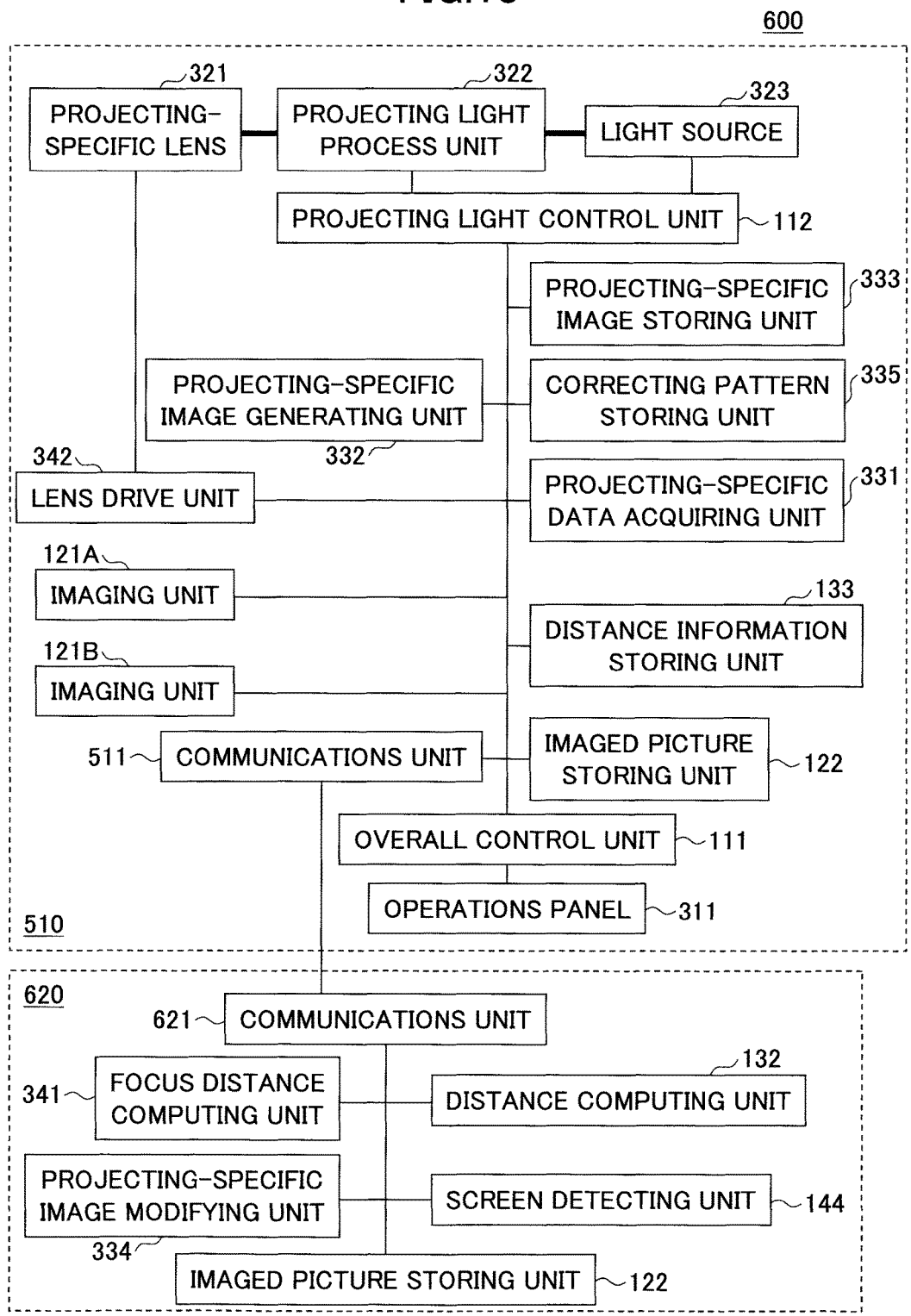
FIG. 18 is a schematic configuration diagram illustrating a projector system according to a fourth embodiment.

FIG. 18 is a schematic diagram illustrating a projector system according to the fourth embodiment. The configuration of a projector system 600 according to the fourth embodiment illustrated in FIG. 18 is similar to the projector system 500 according to the third embodiment illustrated in FIG. 17, and description of the configuration of the projector system 600 is thus omitted.

In FIG. 18, an external processing unit 620 according to the fourth embodiment includes a projecting-specific image modifying unit 334. The external processing unit 620 causes the projecting-specific image modifying unit 334 to perform correction (e.g., enlarging, reducing, keystone correction) on an image corresponding to a projectable range specified by the screen detecting unit 144. The external processing unit 620 then outputs data associated with the corrected image to the projector 610 (i.e., a projecting-specific image storing unit 333).

Hence, the projector system 600 may be capable of reducing a processing amount of the projector 610 by utilizing the external processing unit 620. Accordingly, the projector 610 may be reduced in size and weight, and the configuration of the projector 610 may be simplified. As an example of the external processing unit 620, a personal computer (PC) or the like may be utilized. When the presenter makes a presentation by utilizing the projector 610, the PC or the like utilized for the presentation may be utilized as the external processing unit 620. Further, the external processing unit 620 may include other units such as an imaging unit of the projector 610.

As described above, the image processing apparatus 100 according to the aforementioned embodiments may be capable of specifying the projectable range on the projection target by estimating the projection target in the plane.

Embodiments of the present invention have been described heretofore for the purpose of illustration. The present invention is not limited to these embodiments, but various variations and alterations may be made without departing from the scope of the present invention. The present invention should not be interpreted as being limited to the embodiments that are described in the specification and illustrated in the drawings.

The present application is based on Japanese Priority Application No. 2011-178810 filed on Aug. 18, 2011, with the Japanese Patent Office, the entire contents of which are hereby incorporated by reference.

The invention claimed is:

1. An image processing apparatus, comprising:
a stereo camera configured to image a region including a target on which an image is projected to acquire imaged data; and
processing circuitry configured to
compute, from the acquired imaged data, distance data indicating a distance between the target and the stereo camera to define position data of a group of three-dimensional points;
estimate a plane corresponding to the target, from the position data of the group of three-dimensional points; and
generate image data associated with the region based on the imaged data and specify a projectable range to the target based on the generated image data and information that includes an equation of the estimated plane,
wherein the processing circuitry is further configured to recurrently estimate a new plane by excluding, in estimating the new plane from the position data, first position data of a point of the group of three-dimensional points that is located greater than a predetermined distance from a previously estimated plane.

2. The image processing apparatus as claimed in claim 1, wherein the processing circuitry specifies the projectable range based on at least one of information including color, brightness, and edge strength associated with the generated image data.

3. The image processing apparatus of claim 1, wherein the processing circuitry is further configured to recurrently estimate the new plane by calculating a ratio of (1) a number of points of the group of three-dimensional points present in a predetermined range from a center of the imaged region, to (2) a number of points of the group of three-dimensional points in an entire region of the imaged data, and comparing the calculated ratio with a predetermined ratio.

4. The image processing apparatus of claim 1, wherein the processing circuitry is further configured to estimate the plane using regression analysis on the group of three-dimensional points.

5. The image processing apparatus of claim 1, wherein the processing circuitry is further configured to calculate, for each point of the group of three-dimensional points, a shortest point-plane distance from the point to the estimated plane using the equation of the estimated plane, and exclude the position data of the point that is located greater than the predetermined distance from the estimated plane, based on the calculated shortest point-plane distances.

6. A projector including the image processing apparatus as claimed in claim 1, the projector comprising:
a projecting unit including a light source, the projecting unit configured to project a predetermined pattern.

7. The projector as claimed in claim 6, further comprising:
an autofocus unit configured to adjust a focus of a projected image based on at least one of the distance data and the information associated with the plane.

8. The projector as claimed in claim 6, wherein the processing circuitry is further configured to correct the projected image based on the projectable range.

9. An image processing method, comprising:
imaging a region including a target on which an image is projected to acquire imaged data;
computing, from the acquired imaged data, distance data indicating a distance between the target and a position at which the region including the target is imaged to define position data of a group of three-dimensional points;
estimating a plane corresponding to the target based on the position data of the group of three-dimensional points;
generating image data associated with the region including the target based on the acquired imaged data; and
specifying a projectable range to the target based on the generated image data and information that includes an equation of the estimated plane,
wherein
a new plane is recurrently estimated by excluding, from the position data, first position data of a point of the group of three-dimensional points that is located greater than a predetermined distance from a previously estimated plane.

10. The image processing method as claimed in claim 9, wherein
the projectable range is specified based on at least one of information including color, brightness, and edge strength associated with the generated image data.

11. The image processing method of claim 9, further comprising calculating a ratio of (1) a number of points of the group of three-dimensional points present in a predetermined range from a center of the imaged region, to (2) a number of points of the group of three-dimensional points in an entire region of the imaged data, and comparing the calculated ratio with a predetermined ratio.

* * * * *